(12) United States Patent
Briggs

(10) Patent No.: US 8,941,308 B2
(45) Date of Patent: Jan. 27, 2015

(54) LIGHTING APPARATUS AND METHODS FOR CONTROLLING LIGHTING APPARATUS USING AMBIENT LIGHT LEVELS

(75) Inventor: Gerald Edward Briggs, Ottawa (CA)

(73) Assignee: Arkalumen Inc., Ottawa (CA)

( * ) Notice: Subject to any disclaimer, the term of this patent is extended or adjusted under 35 U.S.C. 154(b) by 134 days.

(21) Appl. No.: 13/423,135

(22) Filed: Mar. 16, 2012

(65) Prior Publication Data

US 2012/0268019 A1    Oct. 25, 2012

Related U.S. Application Data

(60) Provisional application No. 61/453,542, filed on Mar. 16, 2011.

(51) Int. Cl.
*H05B 37/02*         (2006.01)

(52) U.S. Cl.
CPC ............. *H05B 37/0218* (2013.01); *Y02B 20/46* (2013.01); *H05B 37/0272* (2013.01)
USPC ............ 315/158; 315/149; 315/151; 315/152

(58) Field of Classification Search
CPC ........... H05B 33/0806; H05B 33/0833; H05B 33/0842; H05B 33/0845; H05B 33/0869; H05B 33/0818
USPC .................................................. 315/149–159
See application file for complete search history.

(56) References Cited

U.S. PATENT DOCUMENTS

| | | | |
|---|---|---|---|
| 4,593,234 A | 6/1986 | Yang | |
| 5,237,264 A | 8/1993 | Moseley et al. | |
| 5,248,919 A | 9/1993 | Hanna et al. | |
| 5,783,909 A | 7/1998 | Hochstein | |
| 5,949,539 A | 9/1999 | Britton, Jr. et al. | |
| 6,127,798 A * | 10/2000 | Lansang et al. | 320/104 |
| 6,175,195 B1 | 1/2001 | Janczak et al. | |
| 6,198,230 B1 | 3/2001 | Leeb et al. | |
| 6,400,482 B1 | 6/2002 | Lupton et al. | |
| 6,426,599 B1 | 7/2002 | Leeb | |
| 6,495,964 B1 * | 12/2002 | Muthu et al. | 315/149 |
| 6,504,633 B1 | 1/2003 | Hovorka et al. | |
| 6,548,967 B1 | 4/2003 | Dowling et al. | |
| 6,596,977 B2 | 7/2003 | Muthu et al. | |
| 6,621,235 B2 | 9/2003 | Chang | |
| 6,794,831 B2 | 9/2004 | Leeb et al. | |
| 6,853,150 B2 | 2/2005 | Clauberg et al. | |
| 6,894,442 B1 * | 5/2005 | Lim et al. | 315/291 |

(Continued)

*Primary Examiner* — Vibol Tan
(74) *Attorney, Agent, or Firm* — Sean Murray; Murray IP Consulting Inc.

(57) ABSTRACT

Lighting apparatus and methods for controlling lighting apparatus using ambient light levels are disclosed. A controller is used to activate and deactivate one or more light radiating devices within a duty cycle. The controller uses a light detection apparatus to sample ambient light levels at a plurality of sampling times during which the light radiating devices are deactivated. The controller determines an average for the light levels sampled over a survey time period, thus generating an averaged ambient light level over the survey time period. The controller adjusts an intensity of the light radiating devices based at least partially upon the averaged ambient light level. The controller may generate a target light level using the averaged ambient light level over the survey time period and a desired light level and, over an adjustment time period, incrementally adjust the intensity of the light radiating devices towards the target light level.

26 Claims, 18 Drawing Sheets

(56) References Cited

U.S. PATENT DOCUMENTS

| | | |
|---|---|---|
| 6,954,591 B2 | 10/2005 | Lupton et al. |
| 7,016,115 B1 | 3/2006 | Leeb et al. |
| 7,141,779 B1 | 11/2006 | Chew et al. |
| 7,321,203 B2 | 1/2008 | Marosek |
| 7,486,032 B2 | 2/2009 | Lee |
| 7,498,754 B2 | 3/2009 | Masood |
| 7,649,326 B2 | 1/2010 | Johnson et al. |
| 8,193,737 B2 * | 6/2012 | Peker et al. .................. 315/307 |
| 2005/0269580 A1 | 12/2005 | D'Angelo |
| 2006/0239689 A1 | 10/2006 | Ashdown |
| 2007/0159421 A1 | 7/2007 | Peker et al. |
| 2007/0182338 A1 | 8/2007 | Shteynberg et al. |
| 2007/0195552 A1 | 8/2007 | Park |
| 2008/0079705 A1 | 4/2008 | Yang et al. |
| 2008/0138085 A1 | 6/2008 | Lin et al. |
| 2008/0191642 A1 | 8/2008 | Slot et al. |
| 2008/0252664 A1 * | 10/2008 | Huang et al. .................. 345/690 |
| 2008/0272277 A1 * | 11/2008 | Wei ............................... 250/205 |
| 2009/0096392 A1 | 4/2009 | Chandran et al. |
| 2009/0174337 A1 | 7/2009 | Miskin et al. |
| 2009/0251071 A1 | 10/2009 | Gater et al. |
| 2010/0072899 A1 | 3/2010 | Engstrand |
| 2010/0102230 A1 | 4/2010 | Chang et al. |
| 2010/0171429 A1 | 7/2010 | Garcia et al. |
| 2010/0171442 A1 | 7/2010 | Draper et al. |
| 2010/0277075 A1 | 11/2010 | Rees |
| 2011/0115394 A1 | 5/2011 | Shteynberg et al. |
| 2012/0262071 A1 * | 10/2012 | Briggs .......................... 315/152 |

* cited by examiner

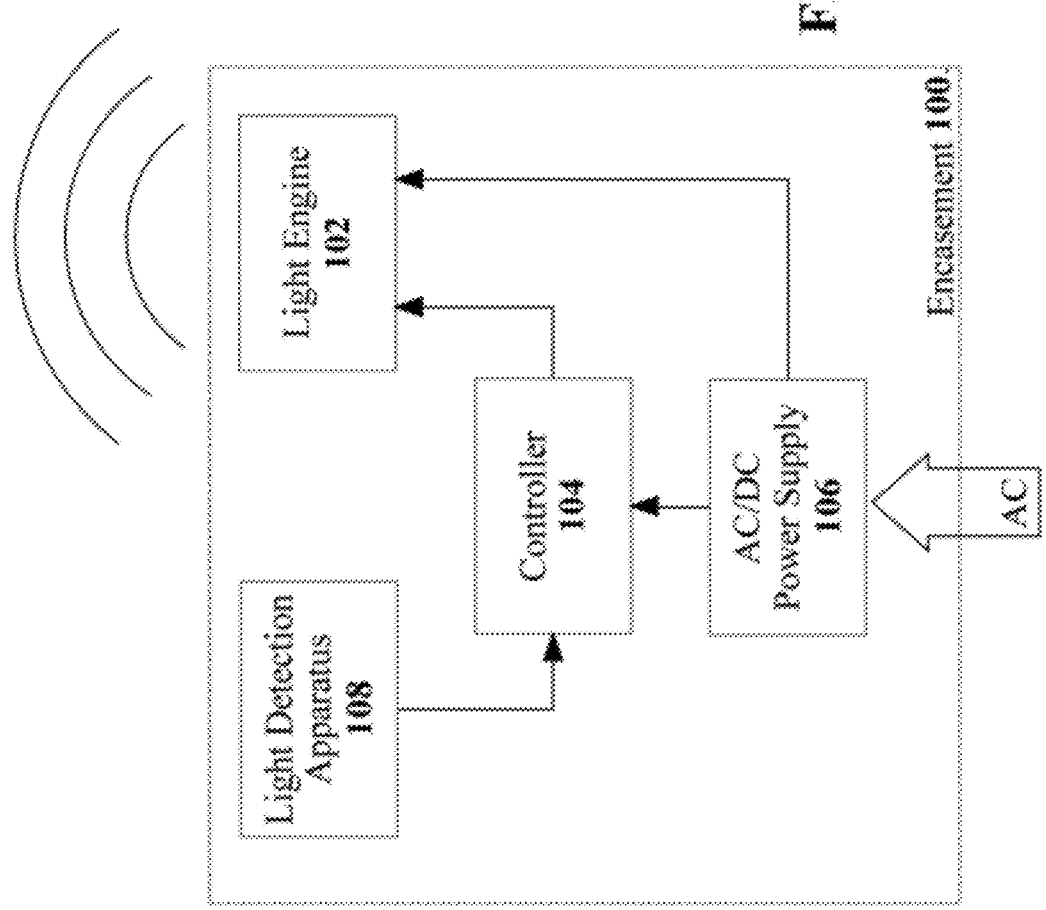

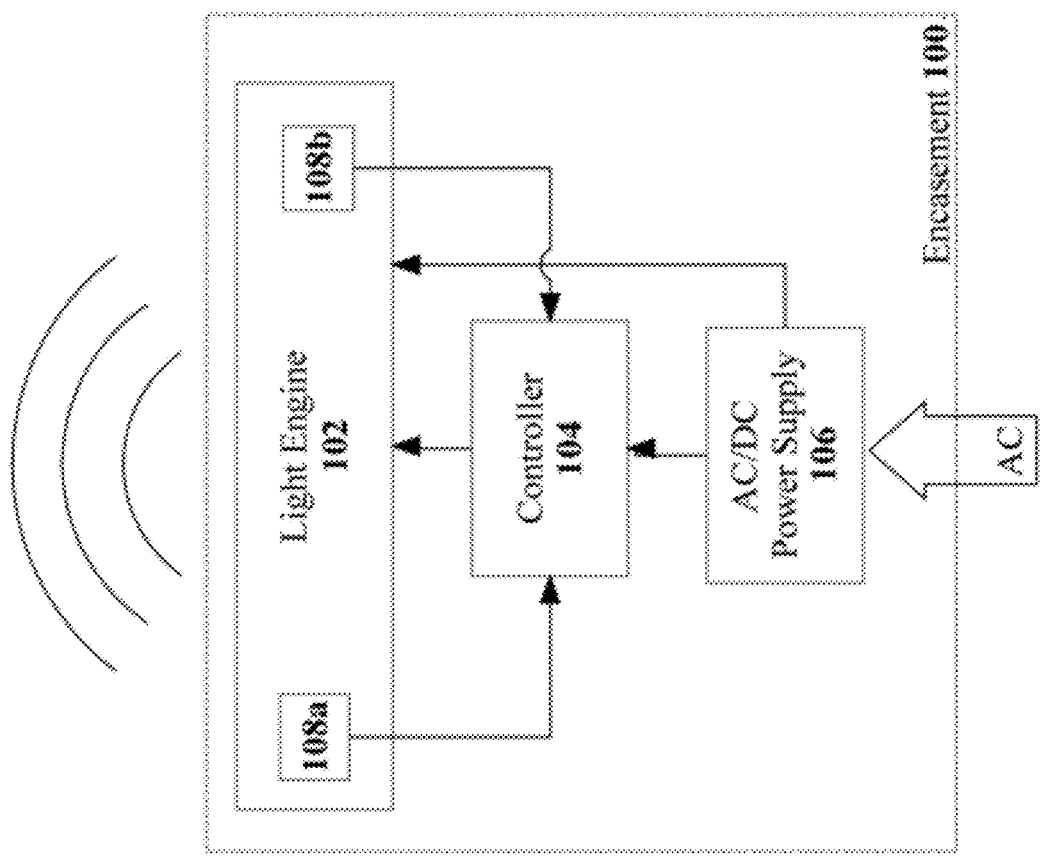

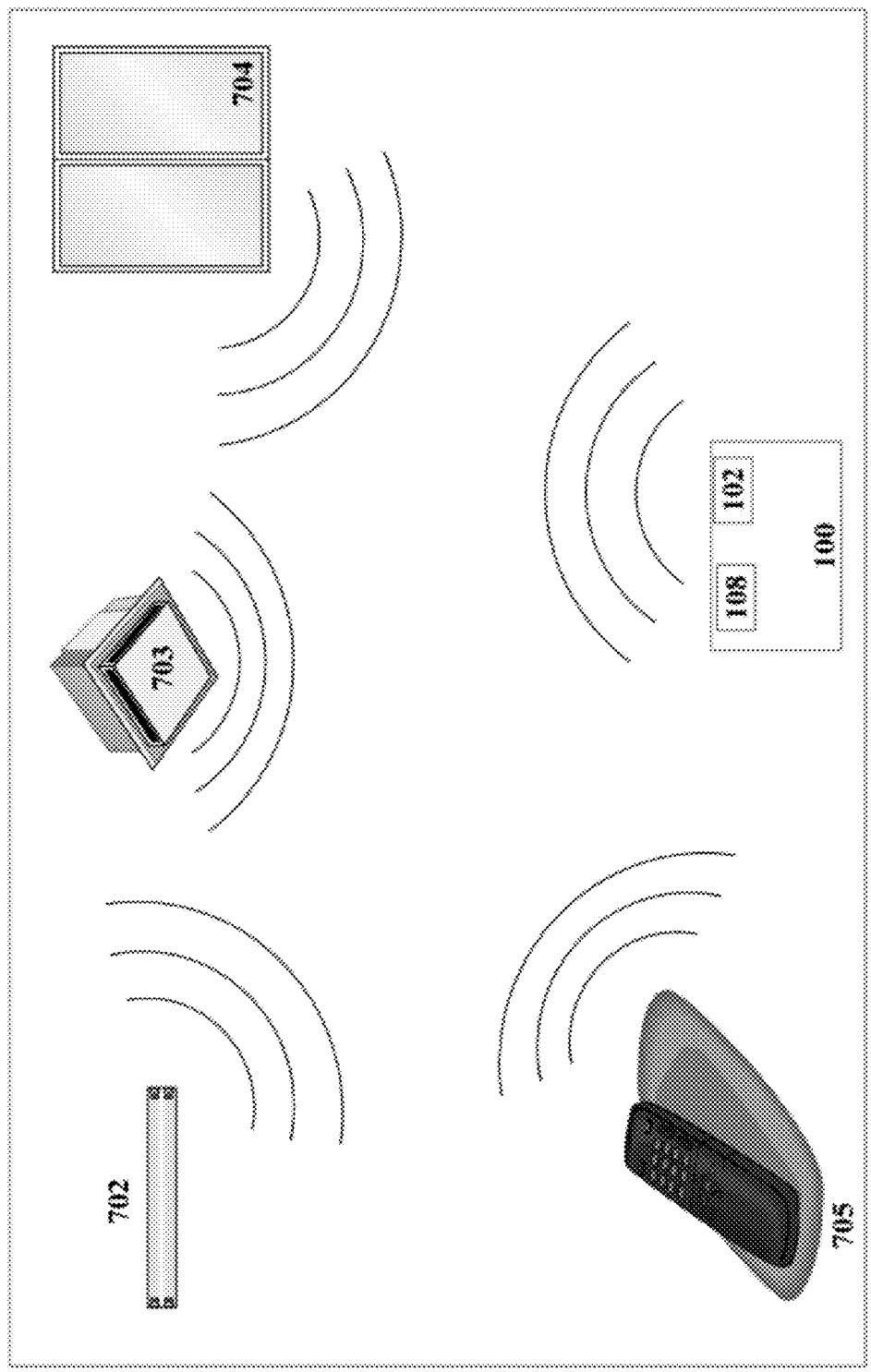

LIGHTING APPARATUS AND METHODS FOR CONTROLLING LIGHTING APPARATUS USING AMBIENT LIGHT LEVELS

CROSS-REFERENCE TO RELATED APPLICATION

The present application claims the benefit under 35 USC 119(e) of U.S. Provisional Patent Application 61/453,542 filed on Mar. 16, 2011 and hereby incorporated by reference herein.

FIELD OF THE INVENTION

The invention relates generally to lighting systems and, more particularly, to lighting apparatus and methods for controlling lighting apparatus using ambient light levels.

BACKGROUND

Light Emitting Diodes (LEDs) are increasingly being adopted as general illumination lighting sources due to their high energy efficiency and long service life relative to traditional sources of light such as incandescent, fluorescent and halogen. Each generation of LEDs are providing improvements in energy efficiency and cost per lumen, thus allowing for lighting manufacturers to produce LED light fixtures at increasingly competitive prices. One differentiator for LEDs over the traditional sources of light is their ability to be controlled very precisely relative to other lighting technologies, with the ability to switch on and off in microseconds.

The intensity of the LEDs within LED lighting fixtures may be adjusted using Pulse Width Modulation (PWM) (i.e. changing the time that the LEDs are activated) or by modifying the current that flows through the LEDs. Some LED systems interoperate with independent light sensors that are operable to continuously detect the local light level. In some cases, the LED lighting fixture will have a desired light level (possibly full intensity or a particular dimmed level set by a user) and may adjust the intensity of the LEDs until the light level detected by the light sensor reaches this desired level. In this system, daylight that may be radiating through windows and/or light from other light sources can be used to reduce the required intensity of light from the LED lighting fixture (generally called "daylight harvesting"), hence reducing overall energy usage required to achieve the desired light level within a room. One problem with this type of daylight harvesting implementation is that it requires the independent light sensor which may be an expensive added component to the system. In this type of architecture, it would be difficult to implement the light sensor within the lighting fixture since the light from the lighting fixture would dominate the light detected by the light sensor.

In some implementations, such as the system disclosed within U.S. Patent Application No. 2010/0171442 by Draper et al., herein incorporated by reference, the lighting system integrates a light sensor into or proximate to the lighting fixture itself and attempts to directly detect ambient light levels (i.e. light coming from other light sources other than the lighting fixture itself) during times in which the LEDs are turned off or reduced in power. In these implementations, the controller may sense the ambient light during a time period of the LEDs in their duty cycle in which they are off and then can adjust the current to dim the light intensity in response to the sensed ambient light as it compares to target data. U.S. Patent Application No. 2010/0171429 by Garcia et al. discloses a similar LED system in which ambient light levels are detected during periods of time in which LEDs are turned off.

There are considerable problems with these integrated systems that include light sensors within LED light fixtures and adjust the intensity of the LEDs based upon ambient light levels sampled in very short time periods (ex. one millisecond) while the LEDs are turned off in a duty cycle. The reality of most environments is that the sources of ambient light are often not consistent in their level of light output and may be relatively unstable when sensed within such a limited time period. In particular, fluorescent and neon lights produce oscillation lighting which has dynamically changing light level outputs that may or may not be perceptible to the human eye. Further, other LED lighting fixtures in the same environment may operate using PWM signaling and have periods of time within each duty cycle in which the LEDs are activated and other periods of time in which the LEDs are deactivated. Yet further, video monitors and televisions that may operate within the environment of the LED lighting fixture may have significant changes of their light level outputs due to changes in the content being displayed in a particular moment of time. Also, use of an infrared remote in proximity to the light sensors may increase a sensed light level at the light sensors temporary. Even natural sources of light such as lightning can cause significant temporary changes in a sensed light level at the light sensors.

These inconsistent sources of ambient light would lead to very different light levels being sampled with each sample within the systems of Draper and Garcia. For instance, in any particular moment, the light level sensed at the light sensor may be significant due to the LEDs within another local LED lighting fixture being activated, the oscillation of a neon or fluorescent lighting fixture providing a high light level, an infrared remote being used, etc. The next moment, the light level sensed at the light sensor may be relatively low due to the LEDs within the other local LED lighting fixture being deactivated, the oscillation of the neon or fluorescent lighting fixture providing a low light level, the infrared remote not being used anymore, etc. These fluctuations in detected light levels may lead directly to large fluctuations in the intensity of the LED lighting fixture as the controller adjusts the intensity of the light fixture in direct response to each of these detected ambient light levels. These fluctuations can cause significant flicker issues within the LED lighting fixture that would likely be perceivable to the human eye and could disturb the user of the lighting fixture.

Against this background, there is a need for solutions that will mitigate at least one of the above problems, particularly allowing LED light fixtures to adjust intensity levels consistently and smoothly in response to ambient light levels.

SUMMARY OF THE INVENTION

According to a first broad aspect, the present invention is a lighting apparatus comprising: one or more light radiating devices operable to be activated and deactivated; a light detection apparatus operable to sense light levels local to the lighting apparatus; and a control apparatus. The control apparatus is operable to sample a light level using the light detection apparatus at a plurality of sampling times during which the light radiating devices are deactivated, the plurality of sampling times occurring over a survey time period. The control apparatus is further operable to generate an average of the light levels sampled over the survey time period; and to adjust a luminous intensity for the light radiating devices based at least partially upon the average of the light levels sampled over the survey time period.

According to a second broad aspect, the present invention is a method for adjusting a luminous intensity of a lighting apparatus. The lighting apparatus comprises one or more light radiating devices operable to be activated and deactivated. The method comprises: sampling a light level at a plurality of sampling times during which the light radiating devices are deactivated, the plurality of sampling times occurring over a survey time period; generating an average of the light levels sampled over the survey time period; and adjusting a luminous intensity for the light radiating devices based at least partially upon the average of the light levels sampled over the survey time period.

According to a third broad aspect, the present invention is a computer-readable media containing a program element executable by a computing system to perform a method for adjusting a luminous intensity of a lighting apparatus. The lighting apparatus comprises one or more light radiating devices operable to be activated and deactivated. Said program element comprises program code for sampling a light level at a plurality of sampling times during which the light radiating devices are deactivated, the plurality of sampling times occurring over a survey time period; program code for generating an average of the light levels sampled over the survey time period; and program code for adjusting a luminous intensity for the light radiating devices based at least partially upon the average of the light levels sampled over the survey time period.

These and other aspects of the invention will become apparent to those of ordinary skill in the art upon review of the following description of certain embodiments of the invention in conjunction with the accompanying drawings.

BRIEF DESCRIPTION OF THE DRAWINGS

A detailed description of embodiments of the invention is provided herein below, by way of example only, with reference to the accompanying drawings, in which:

FIGS. 1A to 1E are logical system diagrams of a lighting apparatus according to embodiments of the present invention;

FIG. 7 is a graphical illustration of light sources within an example room in which a lighting apparatus according to the present invention may be located.

Figure 1B:
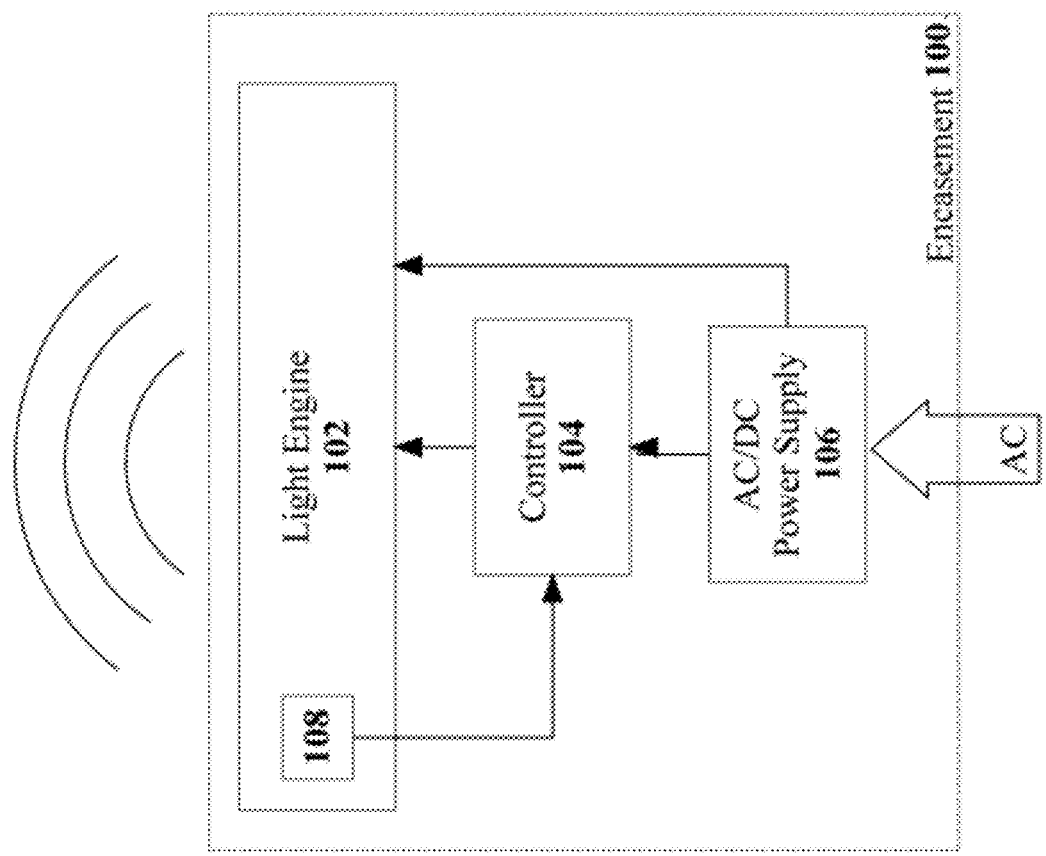

It is to be expressly understood that the description and drawings are only for the purpose of illustration of certain embodiments of the invention and are an aid for understanding. They are not intended to be a definition of the limits of the invention.

DETAILED DESCRIPTION OF EMBODIMENTS

The present invention is directed to lighting apparatus and methods for controlling lighting apparatus using ambient light levels. Within various embodiments of the present invention, a controller within a lighting apparatus is used to activate and deactivate one or more light radiating devices. In a first stage, the controller uses a light detection apparatus to sample an ambient light level at a plurality of sampling times during which the light radiating devices are deactivated. The light level when the light radiating devices are deactivated is an indication of the ambient light levels within the surrounding area of the lighting apparatus. The sampling times occur in different duty cycles within a survey time period. In one example implementation, a sample is taken every 16$^{th}$ duty cycle and 256 samples may be taken over a survey time period of ~4.1 seconds. The controller determines an average for the light levels sampled over the survey time period, thus generating an averaged ambient light level over the survey time period.

In a second stage, the controller adjusts an intensity of the light radiating devices based at least partially upon the averaged ambient light level. In some embodiments of the present invention, the controller generates a target light level using the averaged ambient light level over the survey time period and a desired light level. The desired light level may be determined internally to the controller or may be set by an external component such as a master controller, dimmer, sensor, remote control, building management system, etc. The target light level may be generated by calibrating the averaged ambient light level and proportionally reducing the desired light level by a ratio of the averaged ambient light level to a maximum possible light level. In another embodiment, the averaged ambient light level may be subtracted from the desired light level to generate the target light level. Over an adjustment time period, the controller may then incrementally adjust the intensity of the light radiating devices towards the target light level.

In one example implementation in which the controller uses PWM to control the intensity of the light radiating devices, the controller may continuously compare (ex. every duty cycle, every N duty cycles, at predetermined time intervals, randomly, etc.) a currently set light level for the light radiating devices to the target light level. If the currently set light level is not equal to the target light level, the controller can incrementally adjust the currently set light level for the light radiating devices to decrease the difference between the currently set light level and the target light level. In one case, there may be 65,536 intensity levels for the light radiating devices and the controller may adjust the currently set light level up or down 16 intensity levels each duty cycle if the currently set light level is not equal to the target light level. In this case, if the duty cycle is approximately 1 ms, it would take the controller ~4.1 seconds to adjust the intensity of the light radiating devices from the maximum intensity to the minimum intensity or vice versa as may be required.

Embodiments of the present invention are described below in which the light radiating devices comprise Light Emitting Diodes (LEDs). It should be understood that in some embodiments of the present invention, other light radiating devices could be utilized and the use of LEDs within the description is not meant to limit the scope of the present invention. Specifically, other light radiating devices that allow for sufficiently quick activations/deactivations may be employed. Further, light radiating devices that allow for sufficiently fast adjustments in luminous intensity levels may also be employed.

FIG. 1A is a logical system diagram of an LED lighting apparatus 100 according to one embodiment of the present invention. As depicted, the LED lighting apparatus 100 comprises a number of distinct components that together enable the lighting apparatus 100 to output light. The LED lighting apparatus 100 comprises a light engine 102 which comprises a circuit with LEDs that emit light when activated, the LEDs are one example of light radiating devices; a controller 104 that outputs control signals to the light engine 102 to control the LEDs; an AC/DC power supply 106 that receives AC power from the power grid (not shown) and provides DC power to the controller 104 and the light engine 102; and a light detection apparatus 108 that can detect light levels local to the lighting apparatus 100. Other elements not shown in FIG. 1A but that may also be included within the lighting apparatus 100 include an optics element that diffuses the light output from the LEDs; a thermal element that removes heat generated by the LEDs in order to enable them to operate at an acceptable temperature; and an encasement that provides protective structure and artistic design to the lighting apparatus 100. Further, external control components could be coupled to the lighting apparatus 100 such as dimmers, motion/occupancy sensors, DMX controllers, a master LED controller and/or a building management system.

The light engine 102 may take many shapes, sizes and form factors. It should be understood that although depicted as a single component in FIG. 1A, the light engine 102 may comprise a plurality of components. Further, all or some of the elements within the light engine 102 may be integrated within another component such as the controller 104, the thermal element (not shown) or even the encasement (not shown) or optics element (not shown).

The controller 104 in FIG. 1A manages the activation of the LEDs within the light engine 102 as will be described in detail herein below and, therefore, controls the output luminous intensity and possibly light spectrum that is generated by the lighting apparatus 100. In the architecture depicted in FIG. 1A, the controller 104 receives a constant voltage rail or a constant current source and a reference ground from the AC/DC power supply 106. The controller 104, as will be described below in detail, is operable to sample light levels using the light detection apparatus 108 and may control aspects of the light output from the light engine 102 in response. The controller 104 may further access information stored within a local memory (not shown), internal software or firmware or external components to generate the control signals for the light engine 102. In some embodiments of the present invention, each of the control signals transmitted by the controller 104 to the light engine 102 may comprise a pulse signal that may be in an active high state for a set time within a duty cycle.

As one skilled in the art would understand, the controller 104 can take a number of different forms including a microcontroller programmed with software, firmware, an ASIC, an FPGA, a microprocessor, logical hardware components or other components that can generate digital signals. In one particular embodiment, the controller comprises a microprocessor from Microchip Technologies Inc. of Chandler, Ariz., USA.

The AC/DC power supply 106 may comprise a large number of different power supply configurations depending upon the particular application. For instance, the AC/DC power supply 106 should be selected to match the power needs of the light engine 102 and the controller 104 and particularly to the LEDs within the light engine 102 which will utilize the majority of the power. In one example, a 24V/20 W power supply may be used in a light engine configuration that activates 7 LEDs in series at a time, each LED having a voltage drop of approximately 3.4V in this example.

The light detection apparatus 108 may be implemented in many different manners in different embodiments as will be described in detail with reference to FIGS. 3A to 3D, 4A to 4D and 5A to 5D. The light detection apparatus 108 is operable to sense light levels local to the lighting apparatus 100 and enable the controller 104 to sample the light levels local to the lighting apparatus 100 at various times in operation. The light detection apparatus 108 may be optically isolated from the light engine 102 such that it does not directly sense light being transmitted by the LEDs within the light engine 102, though in other embodiments, the light detection apparatus 108 may be integrated into the lighting apparatus 100 with little or no optical isolation from the light engine 102.

Figure 1D:
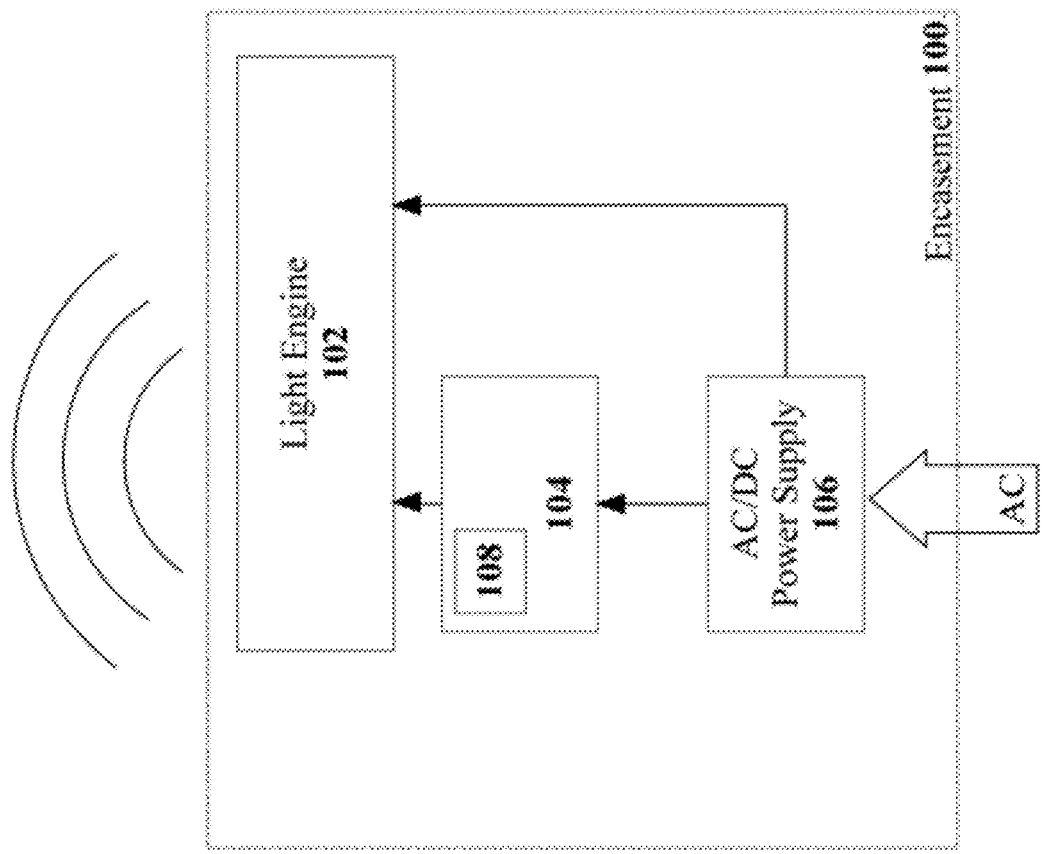
Figure 1E:
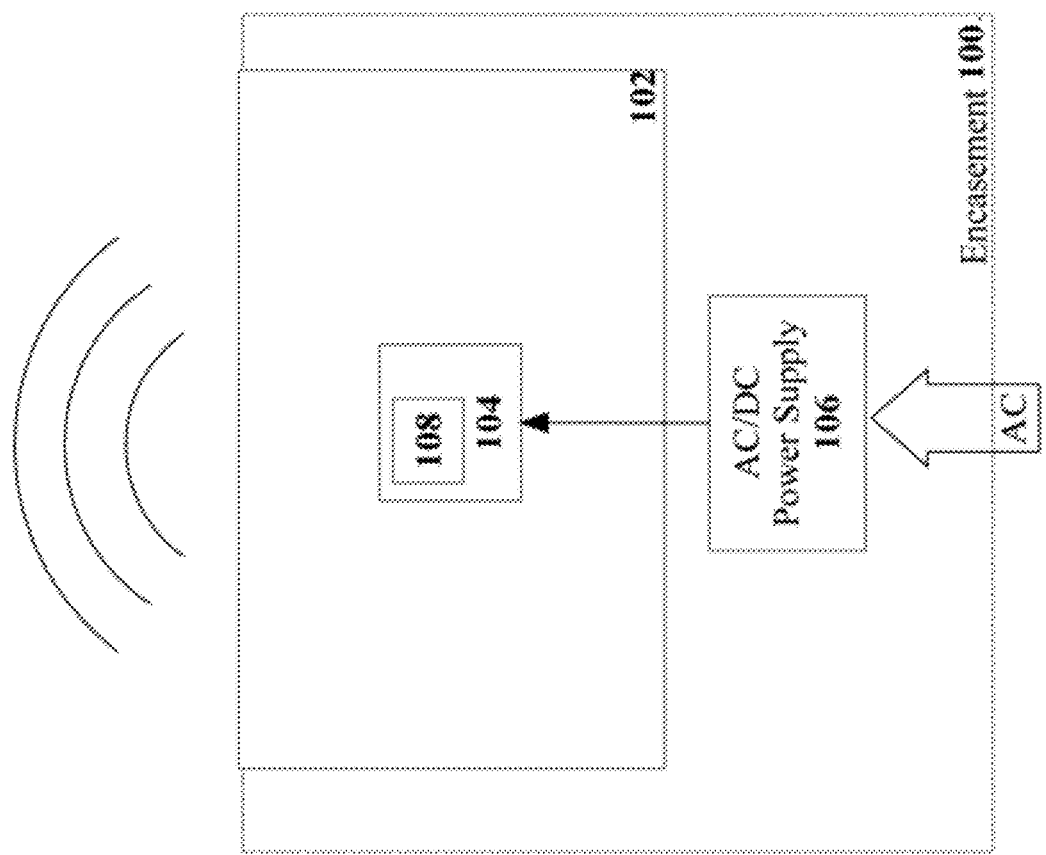

It should be understood that the lighting apparatus 100 of FIG. 1A is only a sample lighting architecture that could be used with the present invention and should not be used to limit the scope of the present invention. Large numbers of alternative lighting architectures are understood by one skilled in the art, a few of which are described with reference to FIGS. 1B to 1E. As depicted in FIG. 1B, the light detection apparatus 108 may be integrated within the light engine 102. The advantage of this architecture is that light detection apparatus 108 may detect ambient light local to the lighting apparatus 100 through the optics that the LEDs within the light engine 102 use to radiate light. As depicted in FIG. 1C, the lighting apparatus 100 may comprise a plurality of light detection apparatus 108a, 108b integrated within the light engine 102 or another location within the lighting apparatus (not shown). The use of a plurality of light detection apparatus 108a, 108b may allow for a more complete sampling of the light level local to the lighting apparatus 100. As depicted in FIG. 1D, the light detection apparatus 108 may be integrated within the controller 104. This architecture allows for a reduced number of components to be implemented within the lighting apparatus 100 and reduces needs for cabling and likely reduces costs. As depicted in FIG. 1E, the controller 104 and the light detection apparatus 108 may be integrated within the light engine 102. In the case shown, the light engine 102 is a rectangular array with the controller 104 implemented in the center and the light detection apparatus 108 integrated within the controller 104. The LEDs within the light engine 102 of FIG. 1E may be implemented surrounding the controller 104 and may be sufficiently close to the controller 104 to avoid having a significant dark spot in the array.

FIG. 7 is a graphical illustration of light sources within an example room in which the lighting apparatus 100 may be located. In this graphical illustration, the lighting apparatus 100 is shown in a simplified form for clarity which only includes the light engine 102 and the light detection apparatus 108. As depicted in FIG. 7, along with the lighting apparatus 100 in this example room, there are additional sources of light, namely a light fixture 702, shown as a fluorescent light tube; a light fixture 703, shown as a troffer that may include one or more LED light engines that are controlled by PWM; a window 704 which may allow sunlight into the room during the daytime and light from street lights, etc. at night; and an infrared remote control 705 that may control a television or another electronic component in the room (ex. lighting apparatus 100).

In embodiments of the present invention, the controller 104 (not shown in FIG. 7 for simplicity) samples the light level local to the lighting apparatus 100 using the light detection apparatus 108 at a plurality of sampling times within a survey time period, each of the sampling times occurring when the LEDs are deactivated. One can approximate the ambient light level sensed at the light detection apparatus 108 when the controller 104 controls the light engine 102 to deactivate the LEDs in the example of FIG. 7 as:

$$I_V(t_1) = I_{A1} + I_{A2} + I_{A3} + I_{A4} + I_N$$

where: $I_V(t_1)$ is the light level sensed at the light detection apparatus 108 at a time $t_1$; $I_{A1}$, $I_{A2}$, $I_{A3}$ and $I_{A4}$ are the light levels sensed at the light detection apparatus 108 due to direct light from the light fixture 702, light fixture 703, window 704 and infrared remote control 705 respectively; and; $I_N$ is a level of noise sensed at the light detection apparatus 108.

The controller 104 averages the sampled light levels across the plurality of sampling times (ex. averaging 256 sampled light levels taken over a survey time period of ~2.5 seconds). By taking a large number of samples and averaging the sampled light levels across a long period of time relative to the instability of many of the ambient light sources, the controller 104 can control the luminous intensity of the lighting apparatus 100 using a more appropriate approximation of the actual ambient light level compared to using instantaneous samples of the ambient light level as done in prior art systems. For instance, by using a large number of samples of the ambient light level, systematic fluctuations in the ambient light level caused by oscillations within neon or fluorescent lights (ex. light fixture 702) or caused by the PWM of the LEDs within an LED light fixture (ex. light fixture 703) can be averaged, similar to how the human eye would naturally average out the light from such light fixtures and see simply a constant light output. Further, the impact of any temporary fluctuations in the ambient light level caused by the use of an infrared remote (ex. remote 705) or caused by lightning seen through a window (ex. window 704), etc. would be mitigated by the averaging of the ambient light levels over the survey time period. Other inconsistent ambient light sources, such as video displays and televisions, would similarly have their light levels averaged, hence effectively contributing a light "noise" level to the average of the sampled light levels.

Figure 2A:
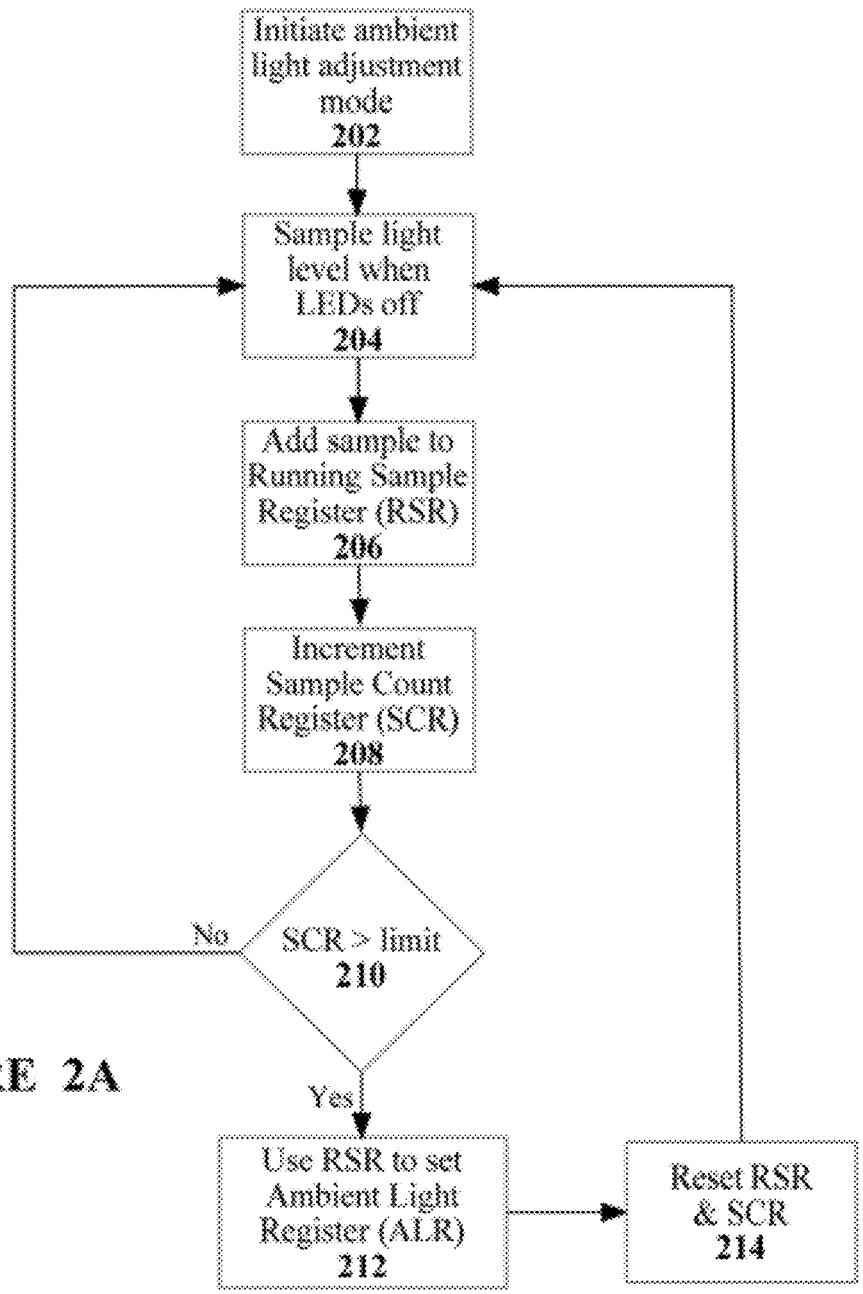
FIGS. 2A, 2B and 2C are flow charts depicting steps performed by a controller operating in an ambient light adjustment mode according to an embodiment of the present invention.
Figure 2C:
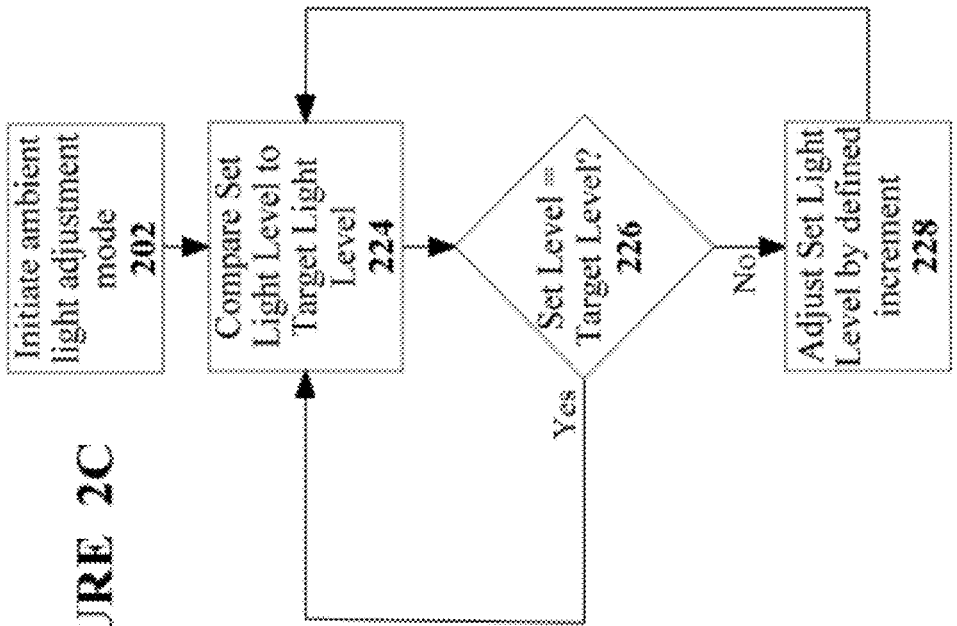
Figure 2B:
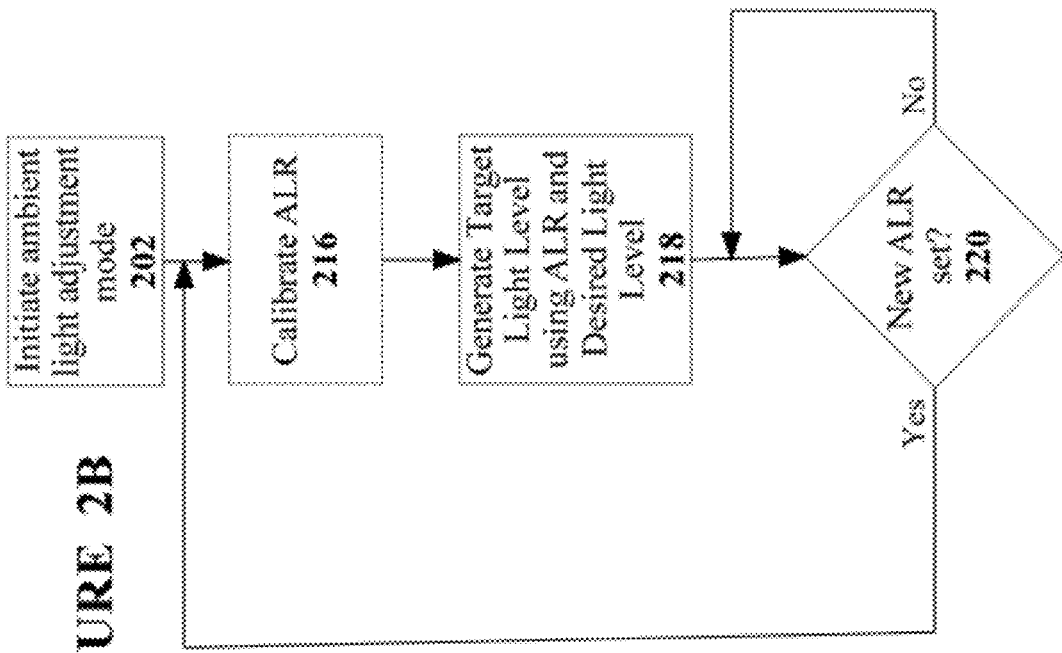

FIGS. 2A, 2B and 2C are flow charts depicting steps performed by the controller 104 operating in an ambient light adjustment mode according to an embodiment of the present invention. In some embodiments of the present invention, the steps depicted in FIGS. 2A, 2B and 2C describe distinct algorithms operating within the controller 104, though in other embodiments, two or more of these algorithms may be integrated together or the steps of these algorithms could be divided into further algorithms. Further, it should be understood that these flow charts depict sample steps performed by the controller 104 in some embodiments of the present invention and other implementations of the present invention may modify one or more of these steps.

FIG. 2A depicts steps performed by the controller 104 in determining an averaged ambient light level over a survey time period according to one embodiment of the present invention. As shown, the steps of FIG. 2A are performed by the controller 104 upon initiation of an ambient light adjustment mode at step 202.

Firstly, as shown at step 204, the controller 104 samples a light level when the LEDs within the light engine 102 are deactivated (i.e. turned off) using the light detection apparatus 108. The time in which the LEDs are deactivated may be a time in which the controller 104 forces the LEDs deactivated as will be described in detail with reference to FIG. 6A or may be a time in which the LEDs are deactivated due to normal PWM signaling as will be described in detail with reference to FIG. 6B. This sampled light level when the LEDs in the light engine 102 are deactivated is a representation of the instantaneous ambient light level local to the lighting apparatus 100 at that particular time. To ensure minimum impact of the light from the lighting apparatus 100 on the sampled light level, the controller 104 may delay sampling the ambient light level by a short period of time (ex. ~10 μs) to ensure that any residual excitation of the phototransistor (or other photo sensitive element used) from the light of the LEDs within the light engine 102 that was recently turned off is no longer present on the phototransistor; and to ensure that phosphor cool-down time of the LEDs within the light engine 102 has been effectively reached. In one implementation, the controller 104 inputs the sampled light level into a two byte register called SampleHigh:SampleLow (SH:SL).

Next, as shown at step 206, the controller 104 adds the sampled light level to a Running Sample Register (RSR). In one implementation, the RSR comprises a three byte register called RunningSampleMega:RunningSampleHigh:RunningSampleLow (RSM:RSH:RSL) and the sampled light level as stored in SH:SL is added to the current value of the RSR. In this case, SL is added to RSL, any carry bits are added to RSH along with SH and RSM is incremented if there is an RSH carry bit.

Subsequently, at step 208, the controller 104 increments a Sample Count Register (SCR) which in one implementation is a one byte register (i.e. 256 bit register). At step 210, the controller 104 determines if the SCR is greater than a predetermined limit of samples that are to be taken within a single survey time period. In one implementation, the survey time period comprises 256 samples of the ambient light levels and therefore, when the one byte SCR resets to zero, the controller 104 determines that the SCR is greater than the limit. If the SCR has not exceeded the limit at step 210, then the controller 104 returns to step 204 and takes an additional sample of the ambient light level when the LEDs within the light engine 102 are deactivated. In specific implementations, the controller 104 is operable to sample the light level every duty cycle, every X duty cycles (ex. every 16 duty cycles) or every predetermined time interval. In a specific example in which a) the controller 104 samples the light level every $6^{th}$ duty cycle; b) the controller 104 operates at 1 kHz (i.e. a duty cycle is equal to ~1 ms); and c) the survey time period comprises 256 samples of the light level; the entire survey time period comprises ~4.1 seconds and the RSR will comprise the sum of 256 sampled light levels.

At step 212, the controller 104 uses the RSR to set an Ambient Light Register (ALR), which is a register used to store an average of the light levels sampled within the previous survey time period. In one implementation, in which the RSR comprises the three byte RSM:RSH:RSL, to calculate the approximate average of the 256 sampled light levels, the controller 104 simply needs to drop the RSL byte. This operation effectively divides the RSR by 256 leaving the RSM:RSH bytes as the average of the sampled light levels. In this case, the controller 104 inserts the RSM:RSH bytes into the ALR at step 212. Finally, at step 214, the controller 104 resets the RSR and the SCR to zero and returns to step 204 to begin the subsequent survey time period.

The algorithm depicted in FIG. 2A is one sample embodiment for the controller 104 to provide an averaged ambient light level to the ALR and to systematically update the ALR with a new averaged ambient light level every survey time period. In one implementation as discussed, the survey time period may be ~4.1 seconds and therefore the ALR in that case would be updated every ~4.1 seconds.

FIG. 2B depicts steps performed by the controller 104 in using the averaged ambient light level as stored in ALR and a desired light level known to the controller 104 to generate a target light level for the lighting apparatus 100. The desired light level is a value (in one implementation, a two byte number from 1 to 65,536) that the controller 104 would have used to control the luminous intensity of the lighting apparatus 100 if the ambient light adjustment mode was not initiated. The desired light level may be calculated internally by the controller 104 (ex. based upon specific algorithms known to one skilled in the art) or may be received from an external component including, but not limited to, a dimmer, a motion/ occupancy sensor, a master controller within another lighting apparatus, an infrared remote, a building management system, etc. In some embodiments, the desired light level is always the full "on" status in which all of the LEDs are fully activated and no dimming takes place (in one implementation such as this, the desired light level may be set to 65,636). As shown, the steps of FIG. 2B are performed by the controller 104 upon initiation of an ambient light adjustment mode at step 202.

At step 216, in some implementations, the controller 104 may need to calibrate the averaged ambient light level within the ALR prior to performing operations with the desired light level since the ALR may not be scaled equivalently to the desired light level. The calibration depends upon the implementation of the light detection apparatus 108 and specifically resistors 304 and 314 within the various embodiments of the light detection apparatus 108 depicted in FIGS. 3A-3D, 4A-4D and 5A-5D. In some cases, no calibration is required.

Next, at step 218, the controller 104 performs operations to generate a target light level using the calibrated ALR and the desired light level. In one implementation, the controller 104 is operable to proportionally reduce the desired light level based upon the ratio of the averaged ambient light level to the maximum possible level (in some implementation, the maximum possible level being 65,536). To do this, in one case, the controller 104 is operable to complement the ALR (i.e. flip all bits from 1 to 0 or 0 to 1) and multiply the result of the complement of ALR by the desired light level. The result of the multiplication, after the least significant two bytes are dropped, comprises a representation of the desired light level reduced proportionally by the ratio of the averaged ambient light level to the maximum possible level. For example, if the averaged ambient light level was extremely high (close to the maximum), the complement would be very low and the resulting target light level would be very low as a proportion to the desired light level. One skilled in the art would understand there are alternative manners to generate a target light level using the desired light level and the averaged ambient light level. For instance, in one alternative, the controller 104 may subtract the averaged ambient light level from the desired light level in order to generate the target light level. Other mathematical operations should be understood and should not limit the scope of the present invention.

At step 220, the controller 104 waits for a new ALR to be set, which may occur each survey time period as per described with reference to the algorithm of FIG. 2A. If a new desired light level is received and/or calculated at the controller 104, the steps 218 and 220 may also need to be repeated.

The algorithm depicted in FIG. 2B is one sample embodiment for the controller 104 to generate a target light level and to systematically update the target light level with a new target light level. In one implementation as discussed, the survey time period may be ~4.1 seconds and therefore the target light level in that case may be updated every ~4.1 seconds.

FIG. 2C depicts steps performed by the controller 104 in using the target light level as calculated in the algorithm of FIG. 2B to adjust the light intensity of the lighting apparatus 100. As shown, the steps of FIG. 2C are performed by the controller 104 upon initiation of an ambient light adjustment mode at step 202.

As shown in step 224, the controller 104 compares a currently set light level for the lighting apparatus 100 to the target light level. The currently set light level may take many forms depending upon the implementation. In one implementation, the currently set light level comprises a two byte register that may be set to any one of 65,536 levels. The currently set light level may be used by the controller 104 to set PWM dimming of the LEDs within the light engine 102, adjust the current flowing through the LEDs within the light engine 102 or otherwise adjust the intensity of the LEDs within the light engine 102 to a plurality of intensity levels. If at step 226, the controller determines that the currently set light level is equal to the target light level, then the controller 104 simply continues to monitor the target light level as it may change due to the algorithm described in detail with reference to FIG. 2B. If the currently set light level does not equal the target light level at step 226, the controller 104 adjusts the currently set light level to bring it closer to the target light level at step 228. In some embodiments, the controller 104 may adjust the currently set light level over numerous different incremental changes to reduce the difference between the currently set light level and the target light level within an adjustment time period. In one implementation, the controller 104 performs the algorithm of FIG. 2C each duty cycle and, if the currently set light level does not equal the target light level, the controller 104 adjusts the currently set light level by X levels every duty cycle until the currently set light level is equal to the target light level. In one case, in which X is equal to 16, a duty cycle comprises ~1 ms and there are 65,536 levels within the currently set light level, the adjustment time period for the controller 104 to move the currently set light level from its minimum to its maximum levels (or vice versa) in response to a target light level may be up to ~4 seconds.

The algorithm depicted in FIG. 2C is one sample embodiment for the controller 104 to adjust a currently set light level in response to a target light level over an adjustment time period. This adjustment time period allows for smooth transitions of the luminous intensity of the lighting apparatus 100 to be implemented as the average ambient light level, and therefore the target light level, changes.

The algorithms of FIGS. 2A, 2B and 2C provide a two stage process for adjusting the luminous intensity of the lighting apparatus 100 in response to ambient light levels local to the lighting apparatus 100. In the first stage as described in detail with reference to FIG. 2A, the controller 104 generates an averaged ambient light output over the survey time period. In the second stage as described in detail with reference to FIGS. 2B and 2C, the controller 104 generates a target light level from the previously generated averaged ambient light level and adjusts the currently set light level (and therefore the luminous intensity of the lighting apparatus 100) to the target light level over the adjustment time period. The combination of the averaging of the ambient light levels over the survey time period and the smooth adjusting of the currently set light level towards the target light level over the adjustment time period removes any significant fluctuations in luminous intensity from occurring within the lighting apparatus 100 and mitigates problems that may occur due to inconsistent ambient light sources.

There is a probability, although relatively low, in which the controller 104 may perform the sampling of ambient light levels synchronized with an ambient light source's changes in luminous intensity. For example, another LED lighting apparatus may be proximate to the lighting apparatus 100 and may operate a PWM dimming at the same frequency as the lighting apparatus 100. In this case, if synchronized, the samples of the ambient light levels may always be performed during a time that the other LED lighting apparatus has its LEDs activated in its duty cycle or during a time that the other LED lighting apparatus has its LEDs deactivated in its duty cycle. In this case, the averaged ambient light level will not depict the true average luminous intensity of the other LED lighting apparatus across its whole duty cycle. This problem could also occur with other ambient light sources that may operate on a similar frequency to the lighting apparatus 100. In some embodiments, to mitigate this problem, the controller 104 may adjust the time within the duty cycle in which the samples of the ambient light levels are performed. In one implementation, the time within the duty cycle in which the controller 104 samples the ambient light level may be randomized or set to change in a systematic manner. In another alternative, the clock of the controller 104 may be adjusted either systematically or randomly to ensure that any synchronization with other LED lighting apparatus would only be temporary. In other embodiments, the controllers within LED lighting apparatus that will be local to each other may be configured not to synchronize in another manner. Further, this problem may be reduced if the other LED lighting apparatus uses power conditioning PWM in which each channel of LEDs is activated and deactivated at different times within the duty cycle to reduce the strain on the power supply 106. Power conditioning is described in U.S. patent application Ser. No. 12/624,414 by Briggs, entitled "METHOD, APPARATUS AND COMPUTER-READABLE MEDIA FOR CONTROLLING LIGHTING DEVICES", herein incorporated by reference.

The design of the light detection apparatus 108 may be done in many different manners. FIGS. 3A to 3D, 4A to 4D and 5A to 5D illustrate twelve various implementations for the light detection apparatus 108, though it should be understood that numerous other designs are possible that could allow the controller 104 to sample a light level local to the lighting apparatus 100. The design of the light detection apparatus 108 should not limit the scope of the present invention.

Figure 3B:
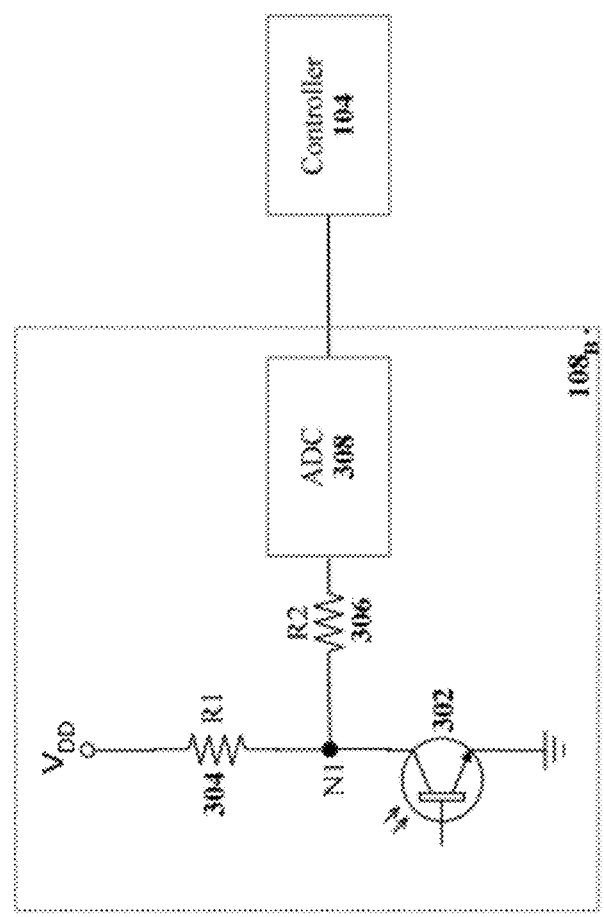
FIGS. 3A, 3B, 3C and 3D are circuit diagrams of a light detection apparatus according to embodiments of the present invention in which a phototransistor is utilized.
Figure 3A:
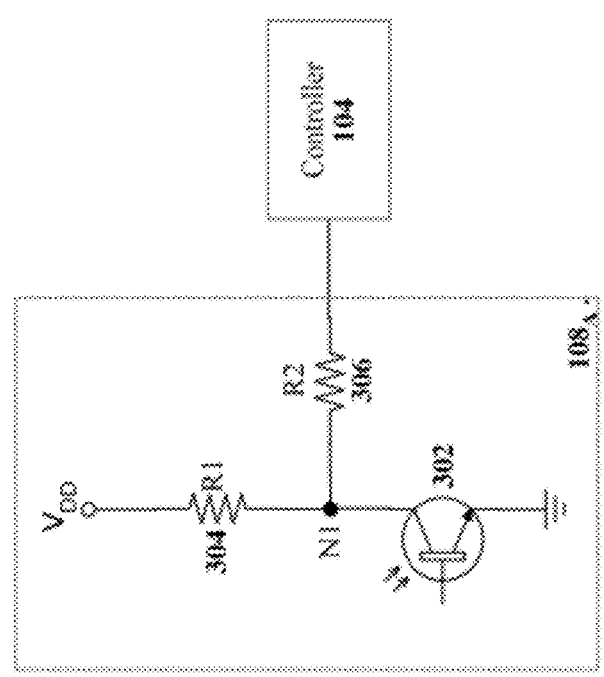

FIGS. 3A, 3B, 3C and 3D are circuit diagrams of the light detection apparatus 108 according to specific embodiments of the present invention in which a phototransistor 302 is utilized. As shown in FIG. 3A, a light detection apparatus $108_A$ comprises a phototransistor 302 coupled between a reference ground and a node N1 while a resistor 304 with a value of R1 is coupled between a supply voltage $V_{DD}$ and the node N1. The node N1 is further coupled to the controller 104 via an isolation resistor 306 with a value of R2. The phototransistor 302 has a dynamic resistance $R_{CE}$ across its collector/emitter that is high if no light is detected (ex. 1MΩ in one example) and goes lower as the phototransistor detects light (ex. 1 kΩ in intense light in one example). The phototransistor 302 has a relatively stable capacitance $C_{CE}$ across its collector/emitter. The voltage $V_1$ at node N1 is determined based on the voltage divider between resistor 304 and the resistance of the phototransistor 302: $V_1 = R_{CE}/(R1+R_{CE}) \times V_{DD}$.

In some embodiments of the present invention, the resistance R1 is selected to be small (ex. 50Ω in one example) in order to ensure a relatively fast response (for example ~10 µs) when the phototransistor 302 senses a change in light level. With a small value for resistance R1, the voltage $V_1$ is very close to the supply voltage $V_{DD}$ and adjusts only slightly based upon the change of resistance across the phototransistor 302 as light is sensed. For example, in one implementation, the voltage $V_1$ may range from ~0.999×$V_{DD}$ to ~0.990×$V_{DD}$. In the embodiment of FIG. 3A, the controller 104 comprises an analog to digital convertor (ADC) which is coupled to the node N1 through the isolation resistor 306 and can convert a voltage at its connection to the light detection apparatus $108_A$ to a digital value for the controller 104 to use as a light level sample. The voltage on either side of the isolation resistor 306 (which may be 1 kΩ in one example) is relatively constant due to the very low current so the sampled voltage is effectively the voltage $V_1$ on node N1.

The ADC within the controller 104 can be set to detect a range of voltages by setting an input for a reference voltage $V_{ref}$ on the controller 104. In one embodiment, the controller 104 uses the same supply voltage $V_{DD}$ as the light detection apparatus $108_A$ which may be 3V and the reference voltage $V_{ref}$ is set at ~2.7V. This would provide a range of 0.3V (2.7V to 3V) for the ADC to detect voltages. In one example implementation, the ADC has a range of 1024 digital outputs depending linearly on the voltage that is converted. Therefore, with a range of 0.3V, the ADC would provide a unique digital output for each 0.29 mV change in the voltage. It should be understood that a different range of voltages could be utilized and/or a different level of digital outputs could be used. The smaller the range of voltages that is used and the larger number of digital outputs from the ADC, the more defined results that can be achieved for the voltage range of interest. For example, if it is known that the voltage $V_1$ will range between ~0.999×$V_{DD}$ to ~0.990×$V_{DD}$ and $V_{DD}$ is 3V, then a $V_{ref}$ of 2.95V could be utilized to provide a smaller range of voltages and to detect a more subtle change in voltage. One skilled in the art would understand that there are a large number of manners to implement a similar ADC.

FIG. 3B illustrates a modified light detection apparatus $108_B$ which is similar to the light detection apparatus $108_A$ of FIG. 3A with like components having the same reference number. As shown, the light detection apparatus $108_B$ further comprises an external ADC 308. In this implementation, the controller 104 is not required to have an ADC and the output of the ADC 308 is a digital input to the controller 104. The function of the light detection apparatus $108_B$ is otherwise identical to that of the light detection apparatus $108_A$ of FIG. 3A.

Figure 3C:
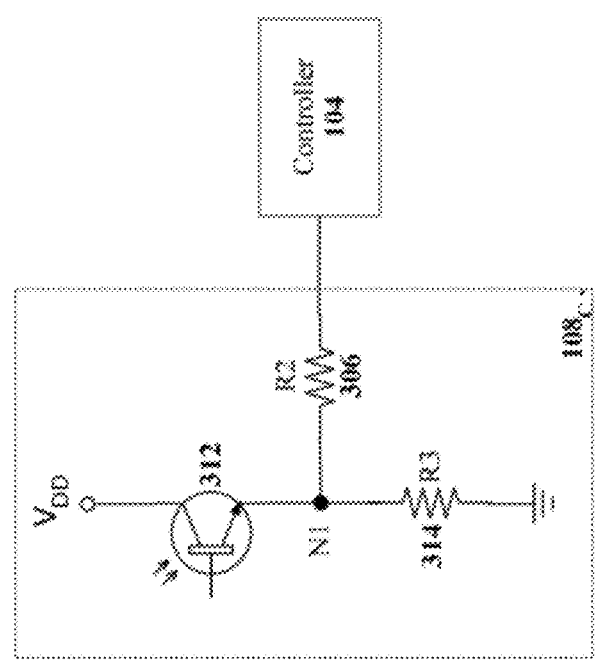

FIG. 3C illustrates a further modified light detection apparatus $108_C$ which is similar to the light detection apparatus $108_A$ of FIG. 3A with like components having the same reference number. As shown, the light detection apparatus $108_C$ comprises a phototransistor 312 coupled between the supply voltage $V_{DD}$ and the node N1 while a resistor 314 with a value of R3 is coupled between a reference ground and the node N1. The voltage $V_1$ at node N1 is determined based on the voltage divider between resistor 314 and the resistance of the phototransistor 312: $V_1 = R3/(R3+R_{CE}) \times V_{DD}$.

In some embodiments of the present invention, the resistance R3 is selected to be small (ex. 50Ω in one example) in order to ensure a relatively fast response (for example 10 µs) when the phototransistor 312 senses a change in light level. With a small value for resistance R3, the voltage $V_1$ is very close to the reference ground and adjusts only slightly based upon the change of resistance across the phototransistor 312 as light is sensed. For example, in one implementation, the voltage $V_1$ may range from ~0.001V to ~0.010V. In the embodiment of FIG. 3C, the controller 104 comprises an ADC similar to the controller 104 of FIG. 3A. In this case, the ADC within the controller 104 can be set to detect a range of voltages by setting an input for a reference voltage $V_{ref}$ on the controller 104. In one embodiment, the controller 104 uses the same reference ground as the light detection apparatus $108_C$ and the reference voltage $V_{ref}$ is set at ~0.3V. This would provide a range of 0.3V (0V to 0.3V) for the ADC to detect voltages. It should be understood that modifications or changes could also be implemented similar to the light detection apparatus $108_A$ and controller 104 of FIG. 3A.

Figure 3D:
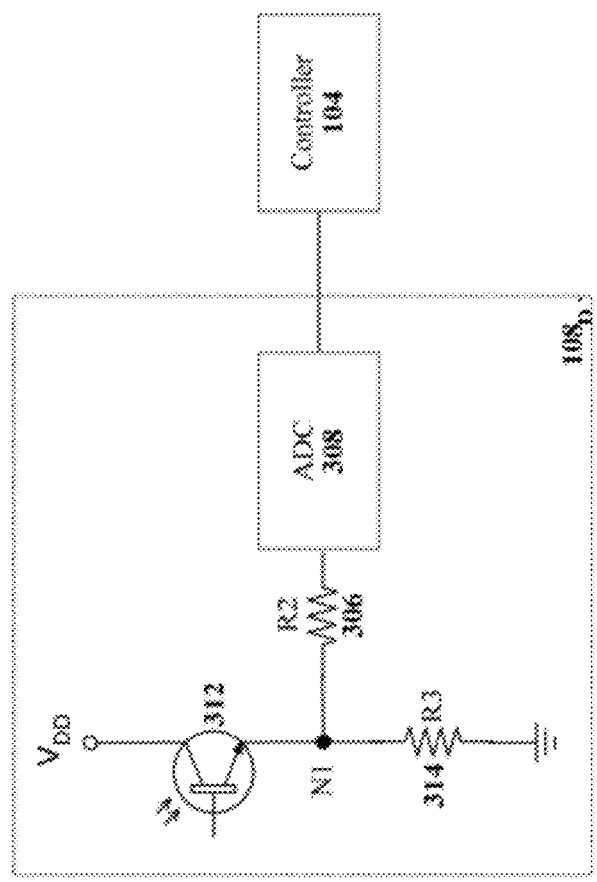
Figure 4B:
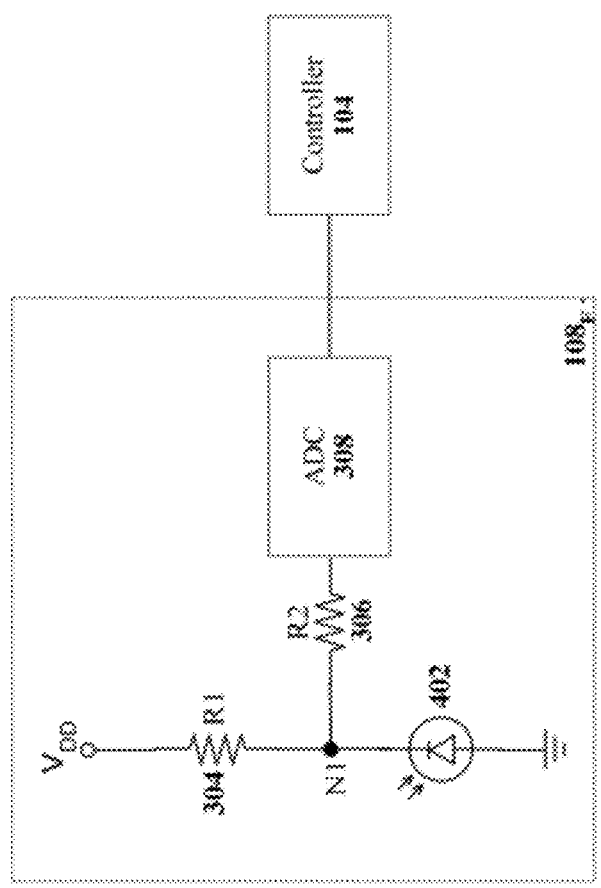
FIGS. 4A, 4B, 4C and 4D are circuit diagrams of a light detection apparatus according to embodiments of the present invention in which a photodiode is utilized.
Figure 4A:
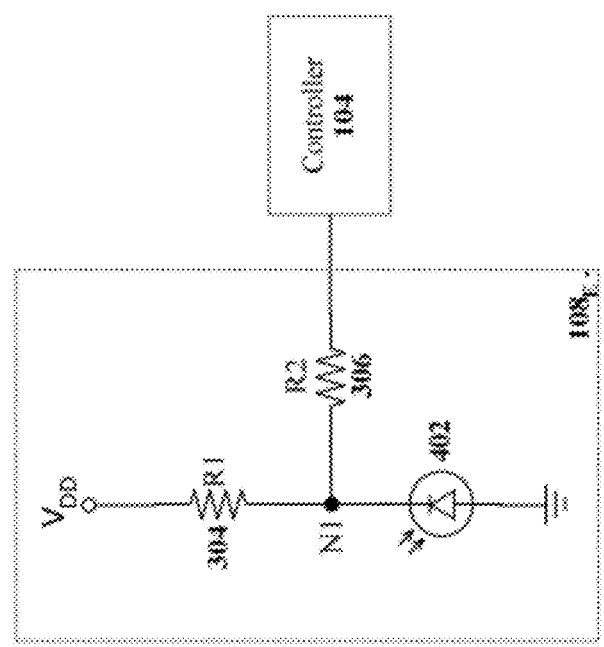
Figure 4D:
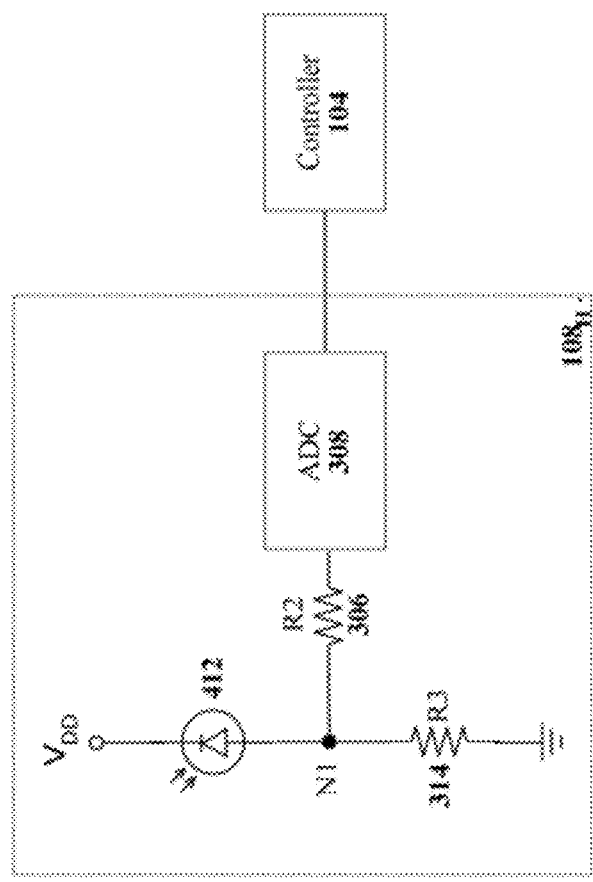
Figure 4C:
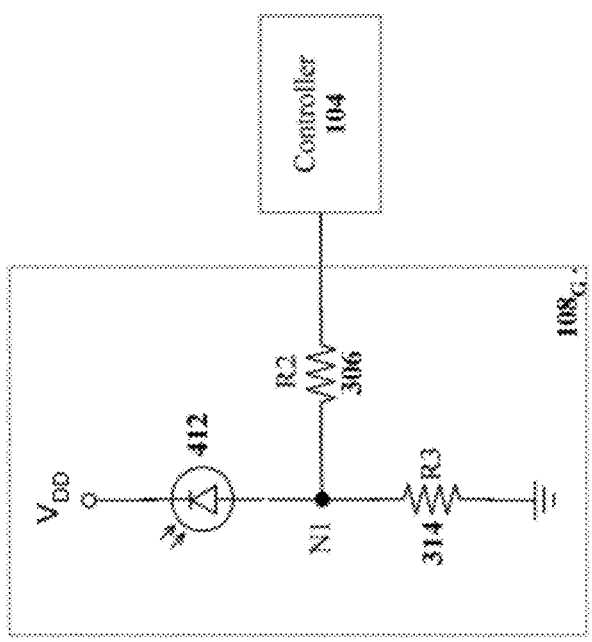
Figure 5B:
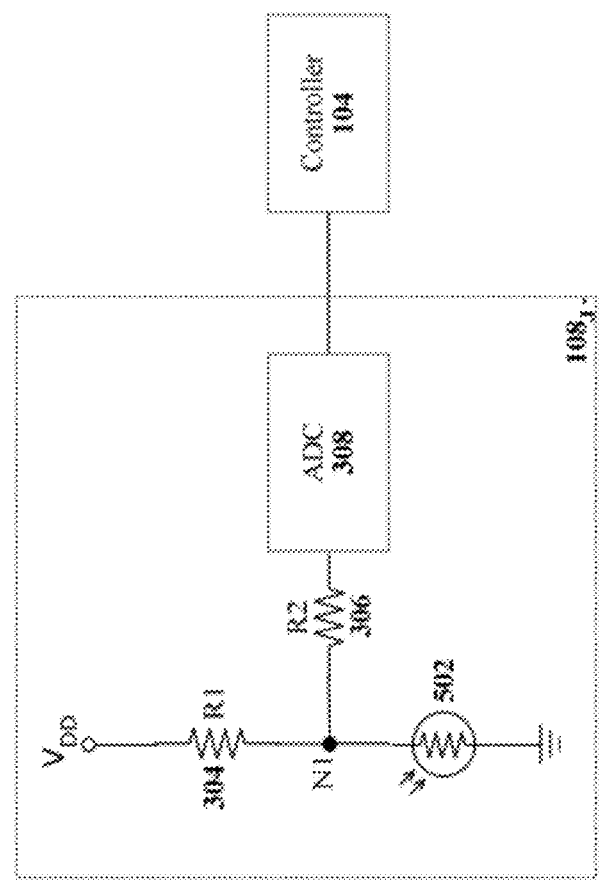
FIGS. 5A, 5B, 5C and 5D are circuit diagrams of a light detection apparatus according to embodiments of the present invention in which a photoresistor is utilized.
Figure 5A:
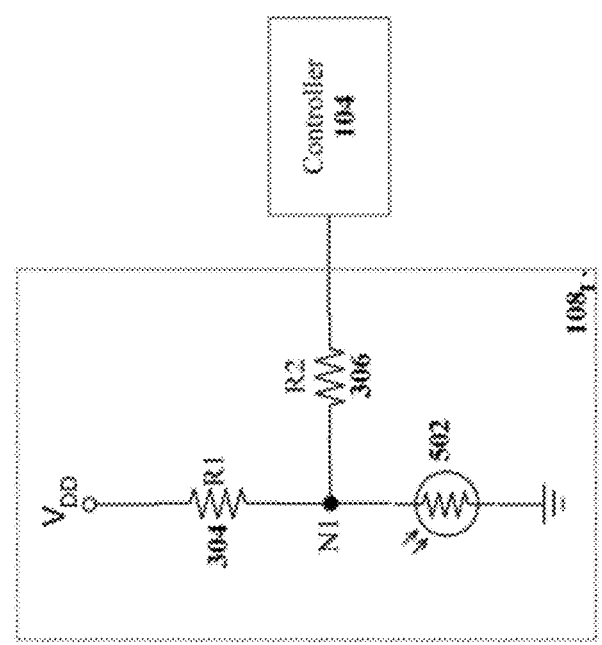
Figure 5D:
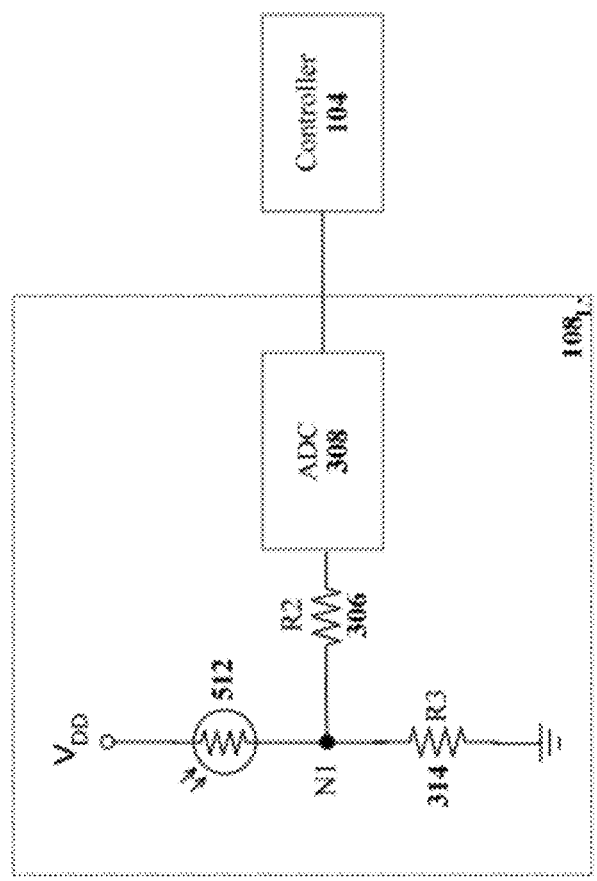
Figure 5C:
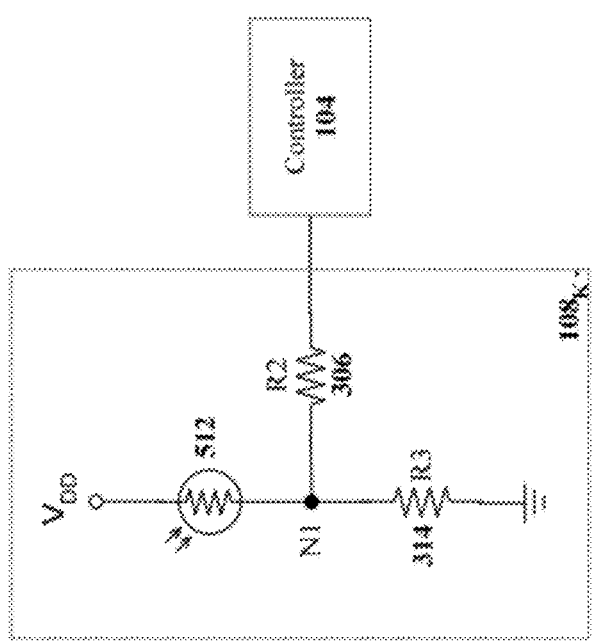

FIG. 3D illustrates a modified light detection apparatus $108_D$ which is similar to the light detection apparatus $108_C$ of FIG. 3C with like components having the same reference number. As shown, the light detection apparatus 108$_D$ further comprises the external ADC 308 similar to that depicted in FIG. 3B. In this implementation, the controller 104 is not required to have an ADC and the output of the ADC 308 is a digital input to the controller 104. The function of the light detection apparatus 108$_D$ is otherwise identical to that of the light detection apparatus 108$_C$ of FIG. 3C.

FIGS. 4A, 4B, 4C and 4D are circuit diagrams of the light detection apparatus 108 according to alternative embodiments of the present invention in which a photodiode 402 is utilized. Each of FIGS. 4A, 4B, 4C and 4D illustrate a different implementation of a light detection apparatus 108$_E$, 108$_F$, 108$_G$, 108$_H$ respectively which are similar to the light detection apparatus 108$_A$, 108$_B$, 108$_C$, 108$_D$ respectively of FIGS. 3A, 3B, 3C, 3D with like components having the same reference number. Each of the light detection apparatus 108$_E$, 108$_F$, 108$_G$, 108$_H$ comprise a photodiode 402 in place of the phototransistor 302 of FIGS. 3A, 3B, 3C, 3D. The current flow through the photodiode 402 is linearly proportional to the light level that is sensed at the photodiode 402. If no light is sensed at the photodiode 402, no current flows through the photodiode 402. For the implementations of FIGS. 4A and 4B, no light would result in the voltage V$_1$ at the node N1 to be close to the supply voltage V$_{DD}$. For the implementations of FIGS. 4C and 4D, no light would result in the voltage V$_1$ at the node N1 to be close to the reference ground. Current flowing through the photodiode 402 increases as light is sensed at the photodiode 402. For the implementation of FIGS. 4A and 4B, this increased light would result in the voltage V$_1$ at the node N1 to decrease from the supply voltage V$_{DD}$. For the implementation of FIGS. 4C and 4D, this increased light would result in the voltage V$_1$ at the node N1 to increase from the reference ground. In specific implementations, the photodiode 402 is reverse biased to force it into photo conductive mode in order to allow for fast response times when light levels change, though photo conductive mode also increases the noise level. An ADC within the controller 104 of FIGS. 4A and 4C and the ADC 308 of FIGS. 4B and 4D can operate similar to as described with reference to FIGS. 3A, 3B, 3C, 3D and convert the voltage V$_1$ to a digital value that the controller 104 can use as a sampled light level.

FIGS. 5A, 5B, 5C and 5D are circuit diagrams of a light detection apparatus according to embodiments of the present invention in which a photoresistor 502 is utilized. Each of FIGS. 5A, 5B, 5C and 5D illustrate a different implementation of a light detection apparatus 108$_I$, 108$_J$, 108$_K$, 108$_L$ respectively which are similar to the light detection apparatus 108$_A$, 108$_B$, 108$_C$, 108$_D$ respectively of FIGS. 3A, 3B, 3C, 3D with like components having the same reference number. Each of the light detection apparatus 108$_I$, 108$_J$, 108$_K$, 108$_L$ comprise a photoresistor 502 in place of the phototransistor 302 of FIGS. 3A, 3B, 3C, 3D. The resistance of the photoresistor 502 is relative to the light level that is sensed at the photoresistor 502. If no light is sensed at the photoresistor 502, the photoresistor 502 has a very high resistance. For the implementations of FIGS. 5A and 5B, no light would result in the voltage V$_1$ at the node N1 to be close to the supply voltage V$_{DD}$. For the implementations of FIGS. 5C and 5D, no light would result in the voltage V$_1$ at the node N1 to be close to the reference ground. Resistance of the photoresistor 502 decreases as light is sensed at the photoresistor 502. For the implementation of FIGS. 5A and 5B, this increased light would result in the voltage V$_1$ at the node N1 to decrease from the supply voltage V$_{DD}$. For the implementation of FIGS. 5C and 5D, this increased light would result in the voltage V$_1$ at the node N1 to increase from the reference ground. An ADC within the controller 104 of FIGS. 5A and 5C and the ADC 308 of FIGS. 5B and 5D can operate similar to as described with reference to FIGS. 3A, 3B, 3C, 3D and convert the voltage V$_1$ to a digital value that the controller 104 can use as a sampled light level. The photoresistor 502 has a relatively slow response time to light level changes compared to the phototransistor 302 of FIGS. 3A, 3B, 3C, 3D and the photodiode 402 in photo conductive mode of FIGS. 4A, 4B, 4C, 4D. This slow response time may make a photoresistor 502 unworkable in some implementations, such as embodiments in which light levels are sampled during time periods of a fast duty cycle in which LEDs are activated and deactivated such that the changes are not perceptible to the human eye.

Figure 6A:
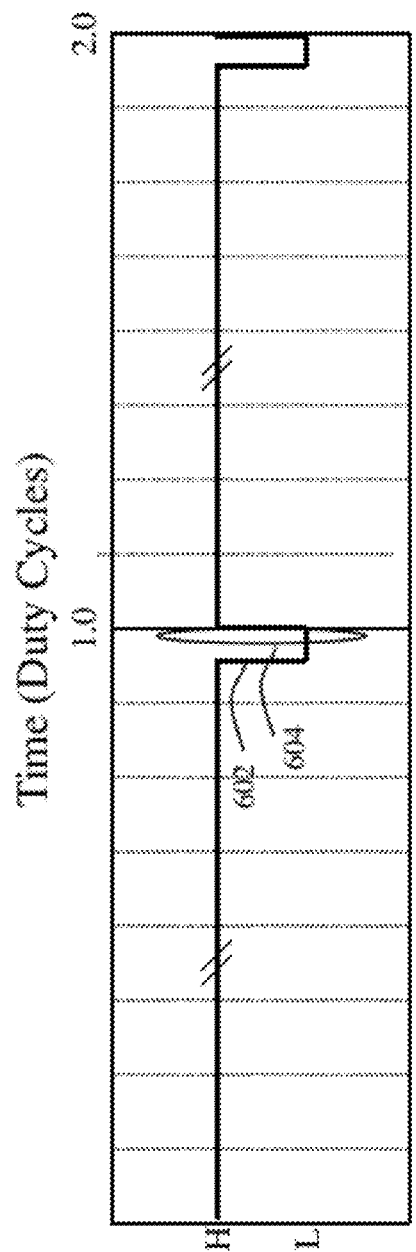
FIGS. 6A, 6B, 6C, 6D and 6E are example signal diagrams for control signals that may control a light engine of FIGS. 1A to 1E.
Figure 6B:
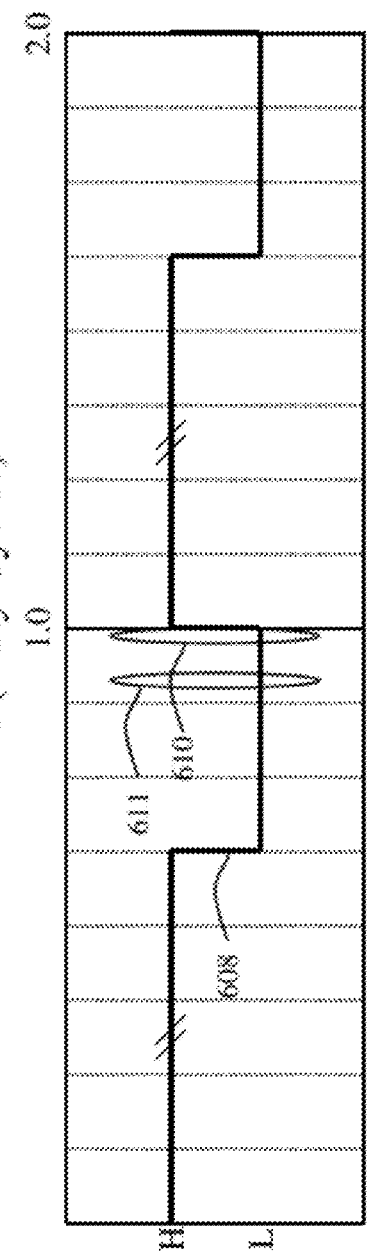
Figure 6C:
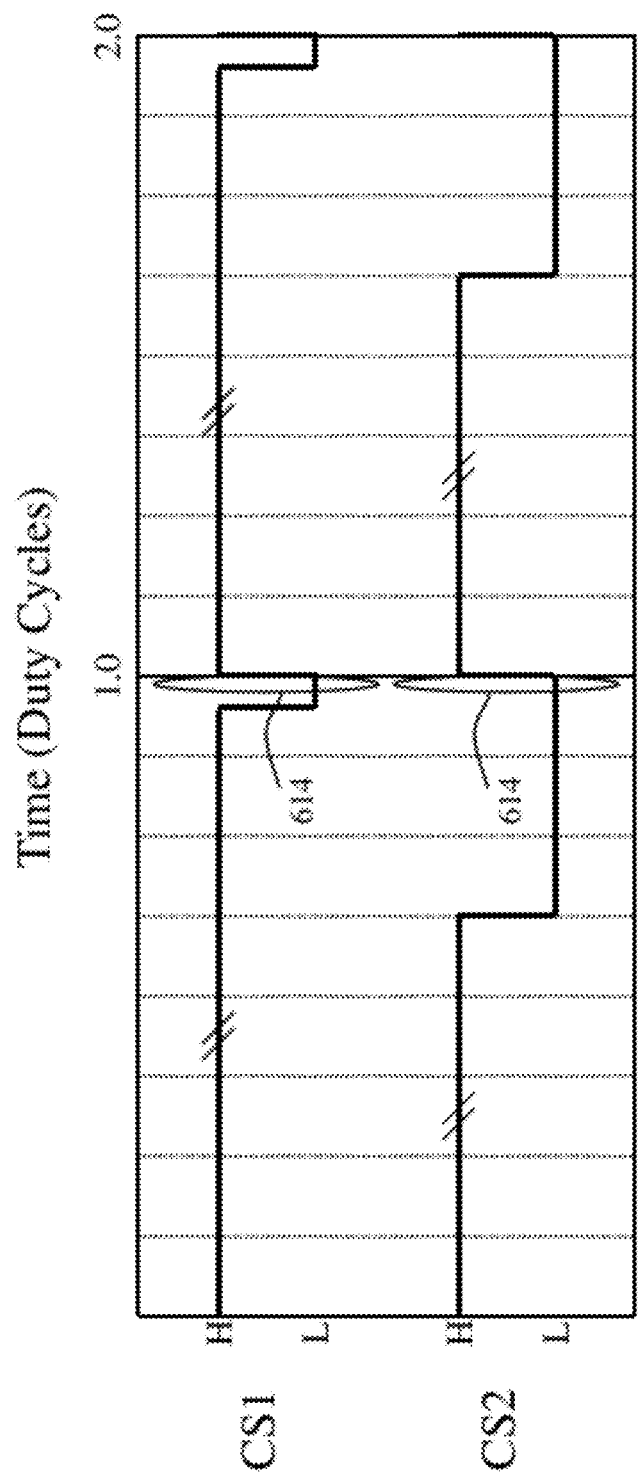
Figure 6D:
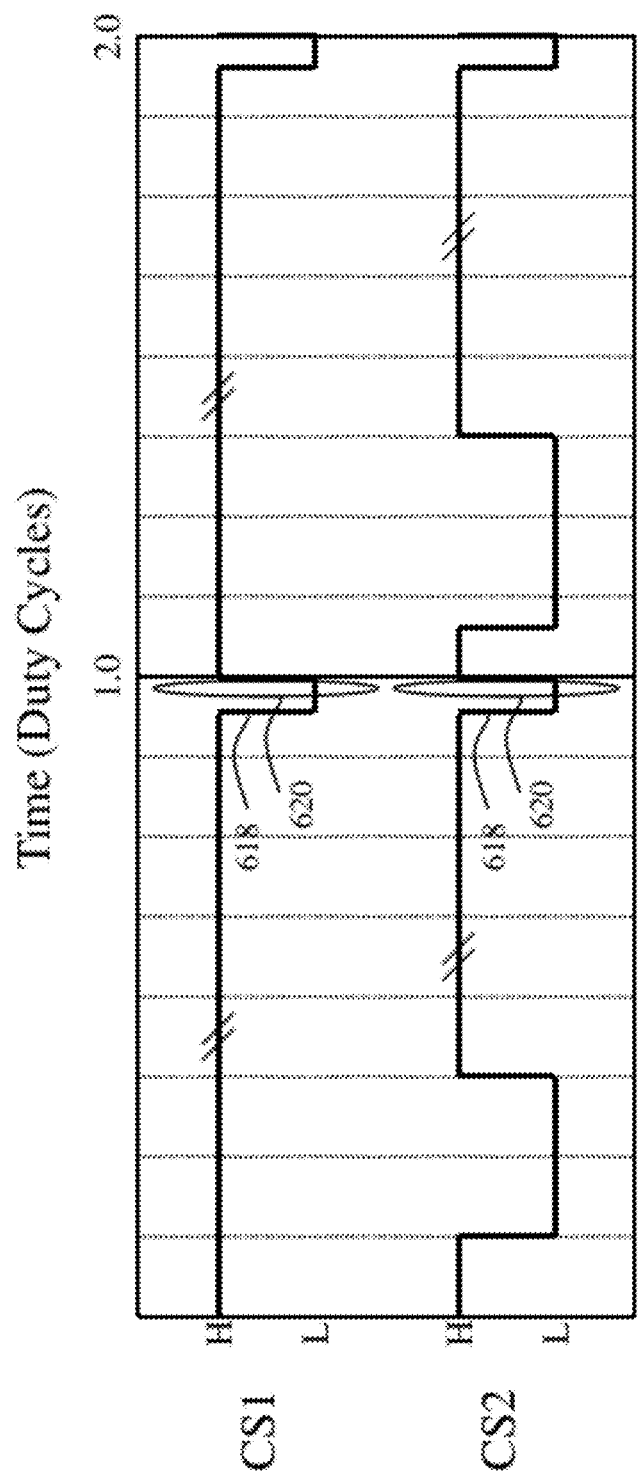

In some embodiments of the present invention, the controller 104 controls the activation and deactivation of the light engine 102 within a duty cycle using a PWM control signal. FIGS. 6A, 6B, 6C and 6D are example signal diagrams for control signals that may control the light engine 102. In the examples of FIGS. 6A and 6B, the control signal (CS) is activating and deactivating all of the LEDs on the light engine 102 with a single CS. In the examples of FIGS. 6C and 6D, there are two control signals, CS1 and CS2 which each control at least a portion of the LEDs in the light engine 102. In the depicted embodiments, the controller 104 is controlling the light engine 102 to ensure that the controller 104 may conduct a sample of light output with the LEDs in the light engine 102 deactivated.

In one implementation in which there are 256 slots within a duty cycle, each slot comprising ~10 μs duration, the controller 104 includes additional slots of similar duration allocated to perform the sample of the light level described herein. During one or more of the additional slots, the controller 104 forces all LEDs within the light engine 102 to be deactivated (the "off" state), so that the ambient light only is detected when the controller 104 samples the light level using the light detection apparatus 108. This forced deactivation can also be used in implementations in which the controller 104 controls the current level flowing through the LEDs of the light engine 102 in order to dim the luminous intensity of the lighting apparatus instead of using PWM signaling.

FIG. 6A depicts an example signal diagram for control signal CS that may control the light engine 102. In this example, the light engine 102 is to be set to 100% intensity over a 256 slot duty cycle followed by a forced deactivation 602 to allow the controller 104 to conduct sampling of the ambient light level with the light engine 102 deactivated. The control signal CS could also be used in the case that the controller 104 controls the current level flowing through the LEDs of the light engine 102 in order to adjust the luminous intensity of the lighting apparatus and only deactivates the LEDs during times in which a sampling of the ambient light level is desired. As shown, the control signal CS is at a high level for all of the slots (256 in this case) of the duty cycle up to a forced deactivation 602 of two slots. In other implementations, the forced deactivation 602 may be shorter or longer than two slots, depending upon design. In the implementation of FIG. 6A, the controller conducts a sample of the ambient light level 604 when the light engine 102 has been forced deactivated for one time slot to ensure the light level is consistent over the sample periods (ex. 10 μs). One benefit of adding a forced deactivation at the end of a duty cycle is that the sampling of light levels becomes independent of the normal control of the light engine 102 for such functions as dimming, color control and/or color temperature control.

Figure 6E:
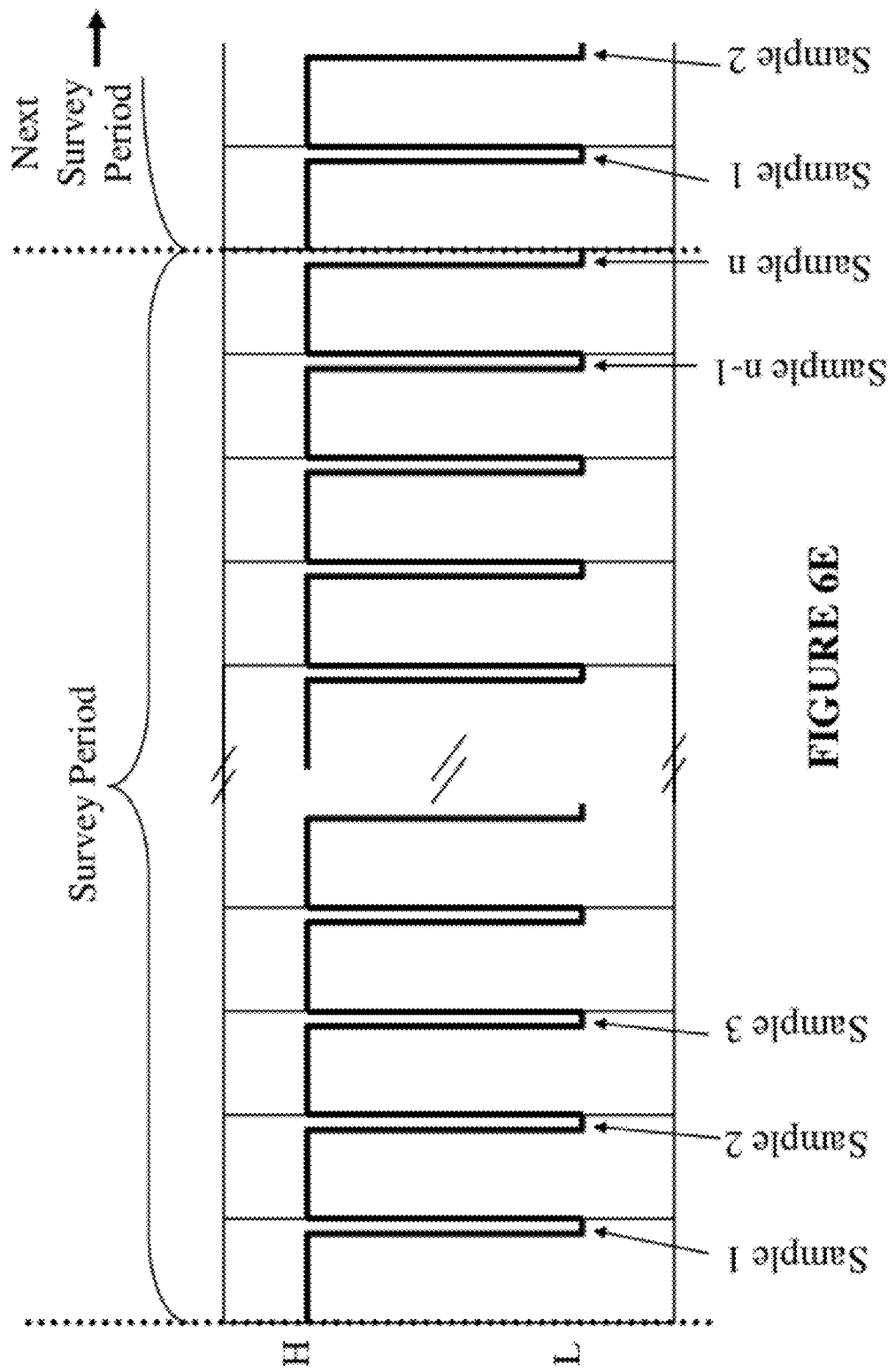

FIG. 6E depicts a signal diagram which illustrates the signal diagram of FIG. 6A but expanded out to a full survey time period. As shown, there are n sample times within the survey time period of FIG. 6E. In one implementation, n may comprise 256 and the sample times may occur at the end of the duty cycle (as per FIG. 6A) every $16^{th}$ duty cycle. In other implementations, other numbers of sample times could be within the survey time period and the samples could occur more or less than every $16^{th}$ duty cycle. In the case that controller 104 controls the current level flowing through the LEDs of the light engine 102 in order to adjust the luminous intensity of the lighting apparatus and only deactivates the LEDs during times in which a sampling of the ambient light level is desired, the survey time period could be divided by time segments and a forced deactivation of the LEDs and subsequent sampling of the ambient light level could occur each time segment.

In an alternative implementation, the controller 104 can conduct the sampling of an ambient light level during a period within the duty cycle in which the light engine 102 would already be deactivated due to normal control of the light engine 102 for such functions as dimming, color control and/or color temperature control. In this case, the controller 104 conducts the samples at times that coincide with the deactivation of the LEDs within the light engine 102. FIG. 6B depicts a signal diagram for control signal CS that may control the light engine 102. In this case, for dimming purposes, the control signal CS is high and therefore the light engine is activated for a set number of slots up to time 608 and then low and therefore the light engine is deactivated for a set number of slots up to the end of the duty cycle. The controller 104 may conduct the sample of the ambient light level during any slot after time 608 in which the light engine 102 is deactivated. Shown in FIG. 6B, the controller 104 may conduct the sample of the ambient light level at the end of the duty cycle (shown as sample 610) or may conduct the sample of the ambient light level at another time during which the light engine 102 is deactivated (shown as sample 611).

In some embodiments, the light engine 102 may comprise a plurality of sets of LEDs that are independently controlled by a plurality of control signals. In these cases, the controller 104 may conduct the sample of the ambient light level while coordinating with both of the control signals to ensure all of the LEDs within the light engine 102 are deactivated. FIG. 6C depicts a signal diagram for first and second control signals CS1, CS2 with which the controller 104 has coordinated samples of the first and second light levels. As shown, the first control signal CS1 is at a high state for all but the final two slots of the duty cycle (an intensity of 99.2% if the duty cycle has 256 slots) while the second control signal is at a high state for all but the final twelve slots of the duty cycle (an intensity of 95.3%). In this example, the controller 104 conducts a sample of the ambient light level 614 in the final slot of the duty cycle during which both the first and second control signals CS1, CS2 have deactivated (turned "off") their respective portion of the light engine 102.

FIG. 6D depicts a signal diagram for first and second control signals CS1, CS2 with which the controller 104 has added a forced deactivation 618 at the end of the duty cycle. In this example, both the first and second control signals CS1, CS2 control their respective portions of the LEDs within the light engine 102 as normal and have additional time slots (ex. two slots in FIG. 6D) added at the end of the normal duty cycle (ex. 256 slots in one implementation). In this example, the controller 104 conducts a sample of the ambient light level 620 during the second slot of the forced deactivation 618 similar to the implementation of FIG. 6A.

Various implementations of the present invention described herein have varying advantages. For instance, the very limited time (as little as 20 µs in some embodiments) for the controller 104 to conduct the samples of the ambient light level during some embodiments allows for the determination of an averaged ambient light level without causing flicker that is perceptible to the human eye. Further, the averaging of a plurality of sampled light levels allows the impact of any fluctuations in ambient light sources to be reduced in determining the target light level and therefore in the adjustment of the luminous intensity of the lighting apparatus 100. Both the survey time period for averaging sampled light levels and the adjustment time period for incrementally adjusting the currently set light level to the target light level allows the lighting apparatus 100 to not over-react to ambient light changes and to not be affected significantly by instantaneous ambient issues. This eliminates the flicker that may otherwise be caused by ambient light sensors that react directly to instantaneous ambient light.

Although various embodiments of the present invention have been described and illustrated, it will be apparent to those skilled in the art that numerous modifications and variations can be made without departing from the scope of the invention, which is defined in the appended claims.

What is claimed is:

1. A lighting apparatus comprising:
 one or more light radiating devices operable to be activated and deactivated;
 a light detection apparatus operable to sense light levels local to the lighting apparatus; and
 a control apparatus operable to sample a light level using the light detection apparatus at a plurality of sampling times during which the light radiating devices are deactivated, the plurality of sampling times occurring over a survey time period; to generate an average of the light levels sampled over the survey time period; and to adjust a luminous intensity for the light radiating devices based at least partially upon the average of the light levels sampled over the survey time period.

2. A lighting apparatus according to claim 1, wherein to sample light levels, the control apparatus is operable to sample light levels using the light detection apparatus at N respective sampling times during which the light radiating devices are deactivated, the N sampling times occurring over the survey time period; wherein each of the N sampling times occurs when the light radiating devices are deactivated within a different duty cycle.

3. A lighting apparatus according to claim 2, wherein a first one of the N sampling times occurs at a first time-interval within a first duty cycle and a second one of the N sampling times occurs at a second time interval within a second duty cycle, the first and second time intervals being different time intervals within their respective duty cycles.

4. A lighting apparatus according to claim 2, wherein each of the N sampling times occurs at a predetermined time within their respective duty cycles.

5. A lighting apparatus according to claim 4, wherein the predetermined time intervals for at least two of the N sampling times being different times within their respective duty cycles relative to each other.

6. A lighting apparatus according to claim 2, wherein each of the N sampling times occurs at a random time within their respective duty cycle.

7. A lighting apparatus according to claim 2, wherein N is greater than a hundred and the survey time period is greater than one second.

8. A lighting apparatus according to claim 2, wherein N is equal to 256.

9. A lighting apparatus according to claim 2, wherein the control apparatus is operable to increment a sampling counter each time the control apparatus samples one of the N light levels; and to generate the average of the light levels sampled over the survey time period and reset the sampling counter once the sampling counter reaches N.

10. A lighting apparatus according to claim 1, to generate an average of the light levels sampled over the survey time period, the control apparatus is operable to sum the light levels sampled over the survey time period within a registry and remove at least one least significant byte from the registry.

11. A lighting apparatus according to claim 1, wherein to adjust a luminous intensity for the light radiating devices, the control apparatus is operable to generate a target light level using the average of the light levels sampled over the survey time period and a desired light level.

12. A lighting apparatus according to claim 11, wherein to generate a target light level, the control apparatus is operable to proportionally reduce the desired light level by a ratio between the average of the light levels sampled over the survey time period and a maximum possible light level.

13. A lighting apparatus according to claim 12, wherein to proportionally reduce the desired light level by a ratio between the average of the light levels sampled over the survey time period and a maximum possible light level, the control apparatus is operable to complement the average of the light levels sampled over the survey time period and multiply the complement by the desired light level.

14. A lighting apparatus according to claim 11, wherein to generate a target light level, the control apparatus is operable to subtract the average of the light levels sampled over the survey time period from the desired light level.

15. A lighting apparatus according to claim 11, wherein to adjust a luminous intensity for the light radiating devices, the control apparatus is further operable to compare a currently set light level for the light radiating devices to the target light level; and, if the currently set light level is not equal to the target light level, to incrementally adjust the currently set light level for the light radiating devices to decrease the difference between the currently set light level and the target light level.

16. A lighting apparatus according to claim 15, wherein the control apparatus is operable to compare the currently set light level for the light radiating devices to the target light level continuously.

17. A lighting apparatus according to claim 15, wherein the control apparatus is operable to incrementally adjust the currently set light level for the light radiating devices to decrease the difference between the currently set light level and the target light level at least once each duty cycle.

18. A lighting apparatus according to claim 15, wherein the control apparatus is operable to incrementally adjust the currently set light level for the light radiating devices to decrease the difference between the currently set light level and the target light level a plurality of times during an adjustment time period until the currently set light level equals the target light level, the adjustment time period comprising a plurality of duty cycles.

19. A lighting apparatus according to claim 18, wherein the adjustment time period is greater than two seconds.

20. A lighting apparatus according to claim 11, wherein the control apparatus is operable to receive the desired light level from a master controller remote from the lighting apparatus.

21. A lighting apparatus according to claim 11, wherein the control apparatus is operable to receive the desired light level from at least one of a dimmer, a sensor, a remote control and a building management system.

22. A lighting apparatus according to claim 11, wherein the desired light level is a light level in which the light radiating devices are substantially always activated.

23. A lighting apparatus according to claim 1, wherein to adjust a luminous intensity for the light radiating devices, the control apparatus is operable to adjust an activation time for the light radiating devices to be activated within a duty cycle based at least partially upon the average of the light levels sampled over the survey time period.

24. A lighting apparatus according to claim 1, wherein to adjust a luminous intensity for the light radiating devices, the control apparatus is operable to adjust current level flowing through the light radiating devices based at least partially upon the average of the light levels sampled over the survey time period.

25. A method for adjusting a luminous intensity of a lighting apparatus, the lighting apparatus comprising one or more light radiating devices operable to be activated and deactivated, the method comprising:
sampling a light level at a plurality of sampling times during which the light radiating devices are deactivated, the plurality of sampling times occurring over a survey time period;
generating an average of the light levels sampled over the survey time period; and
adjusting a luminous intensity for the light radiating devices based at least partially upon the average of the light levels sampled over the survey time period.

26. A control apparatus operable to control a lighting apparatus comprising one or more light radiating devices operable to be activated and deactivated; wherein the control apparatus is operable:
to sample a light level at a plurality of sampling times during which the light radiating devices are deactivated, the plurality of sampling times occurring over a survey time period;
to generate an average of the light levels sampled over the survey time period; and
to adjust a luminous intensity for the light radiating devices based at least partially upon the average of the light levels sampled over the survey time period.

* * * * *